US011987486B2

(12) United States Patent
Melrose et al.

(10) Patent No.: US 11,987,486 B2
(45) Date of Patent: May 21, 2024

(54) SYSTEM FOR PROCESSING CONTAINERS

(71) Applicant: DAVID MELROSE DESIGN LIMITED, Auckland (NZ)

(72) Inventors: David Murray Melrose, Auckland (NZ); Campbell Melrose-Allen, Auckland (NZ)

(73) Assignee: DAVID MELROSE DESIGN LIMITED, Auckland (NZ)

(*) Notice: Subject to any disclaimer, the term of this patent is extended or adjusted under 35 U.S.C. 154(b) by 0 days.

(21) Appl. No.: 18/191,203

(22) Filed: Mar. 28, 2023

(65) Prior Publication Data

US 2023/0234824 A1 Jul. 27, 2023

Related U.S. Application Data

(63) Continuation of application No. 17/667,802, filed on Feb. 9, 2022, now abandoned, which is a continuation (Continued)

(30) Foreign Application Priority Data

May 30, 2017 (NZ) ....................................... 732317

(51) Int. Cl.
*B67C 7/00* (2006.01)
*B65B 31/02* (2006.01)
(Continued)

(52) U.S. Cl.
CPC .............. *B67C 7/00* (2013.01); *B65B 31/025* (2013.01); *B65B 31/042* (2013.01);
(Continued)

(58) Field of Classification Search
CPC ........... B67C 3/023; B67C 3/045; B67C 3/14; B67C 3/208; B67C 3/222; B67C 7/00;
(Continued)

(56) References Cited

U.S. PATENT DOCUMENTS 3,809,768 A * 5/1974 Berry .................... B65B 55/027
264/525
4,919,955 A * 4/1990 Mitchell ................. B65B 31/08
426/316
(Continued)

FOREIGN PATENT DOCUMENTS

FR 3035876 A1 11/2016
GB 2 271 347 A 9/1994
(Continued)

OTHER PUBLICATIONS

International Search Report and Written Opinion dated Sep. 27, 2018 issued in International Application No. PCT/NZ2018/050076 (10 pages).

(Continued)

*Primary Examiner* — Stephen F. Gerrity
(74) *Attorney, Agent, or Firm* — Rothwell, Figg, Ernst & Manbeck, P.C.

(57) ABSTRACT

One embodiment of the present invention provides a system for processing containers. The system may include an apparatus for processing sealed plastic containers having a first headspace pressure. The apparatus may include: an open entry port or tunnel for continuously receiving containers; a sanitizer configured to sanitize outside surfaces of the received containers; a perforator configured to perforate or open a cap or seal of the containers within the apparatus; a sealer configured to seal the perforation or opening formed in the cap or seal of the containers; an open exit port or tunnel for continuously exiting the processed containers; and a conveyor system configured to transport or convey the containers. The system may further include a production line including a filler for filling empty blow-moulded containers with a heated liquid to pasteurize inside surfaces of the (Continued)

containers and a capper for sealing the filled blow moulded containers.

22 Claims, 17 Drawing Sheets

Related U.S. Application Data of application No. 16/618,298, filed as application No. PCT/NZ2018/050076 on May 30, 2018, now Pat. No. 11,274,025.

(51) Int. Cl.

| | |
|---|---|
| ***B65B 31/04*** | (2006.01) |
| ***B65B 31/06*** | (2006.01) |
| ***B65B 31/08*** | (2006.01) |
| ***B65B 55/02*** | (2006.01) |
| ***B67C 3/02*** | (2006.01) |
| ***B67C 3/14*** | (2006.01) |
| ***B67C 3/20*** | (2006.01) |
| ***B67C 3/22*** | (2006.01) |

(52) U.S. Cl.

CPC ............ *B65B 31/044* (2013.01); *B65B 31/06* (2013.01); *B65B 31/08* (2013.01); *B65B 55/025* (2013.01); *B65B 55/027* (2013.01); *B67C 3/023* (2013.01); *B67C 3/14* (2013.01); *B67C 3/208* (2013.01); *B67C 7/004* (2013.01); *B67C 7/0086* (2013.01); *B65B 2220/24* (2013.01); *B67C 2003/226* (2013.01); *B67C 2003/227* (2013.01); *B67C 2003/228* (2013.01)

(58) Field of Classification Search

CPC ....... B67C 7/004; B67C 7/0073; B67C 7/008; B67C 7/0086; B67C 2003/226; B67C 2003/227; B67C 2003/228; B67C 2007/0066; B65B 31/006; B65B 31/025; B65B 31/041; B65B 31/042; B65B 31/044; B65B 31/046; B65B 31/06; B65B 31/08; B65B 55/02; B65B 55/025; B65B 55/027; B65B 2220/24

USPC ......... 53/425, 426, 432, 440, 471, 510, 127, 53/282

See application file for complete search history.

(56) References Cited

U.S. PATENT DOCUMENTS

| | | | | |
|---|---|---|---|---|
| 4,969,915 | A * | 11/1990 | Hatanaka et al. | B65B 55/04 53/425 |
| 5,549,143 | A | 8/1996 | Spica et al. | |
| 6,256,964 | B1 * | 7/2001 | Drevfors | B65B 55/025 53/426 |
| 8,234,843 | B2 | 8/2012 | Rainwala | |
| 9,643,746 | B1 | 5/2017 | Lunn | |
| 11,274,025 | B2 | 3/2022 | Melrose et al. | |
| 2004/0222224 | A1 * | 11/2004 | Plester | B67C 7/008 220/203.18 |
| 2009/0098250 | A1 | 4/2009 | Py | |
| 2010/0071803 | A1 | 3/2010 | Clüsserath et al. | |
| 2010/0094245 | A1 | 4/2010 | Py | |
| 2010/0162662 | A1 | 7/2010 | Iwashita et al. | |
| 2014/0260100 | A1 | 9/2014 | Taber et al. | |
| 2015/0266600 | A1 | 9/2015 | Haimi | |
| 2017/0008745 | A1 | 1/2017 | Melrose | |
| 2018/0127126 | A1 | 5/2018 | Delage | |
| 2019/0248524 | A1 | 8/2019 | Roidl et al. | |
| 2019/0329920 | A1 | 10/2019 | Delage | |

FOREIGN PATENT DOCUMENTS

| | | | |
|---|---|---|---|
| JP | 2670062 | B2 * | 10/1997 |
| WO | 2014/005706 | A1 | 1/2014 |
| WO | 2016177987 | A1 | 11/2016 |

OTHER PUBLICATIONS

Supplemental European Search Report dated Feb. 11, 2021 issued in EP 18 80 9592 (2 pages).

* cited by examiner

SYSTEM FOR PROCESSING CONTAINERS

CROSS-REFERENCE TO RELATED APPLICATIONS

This application is a continuation of U.S. patent application Ser. No. 17/667,802, filed on Feb. 9, 2022, now abandoned, which is a continuation of U.S. patent application Ser. No. 16/618,298, filed on Nov. 29, 2019, now U.S. Pat. No. 11,274,025, which is a 35 U.S.C § 371 National Stage of International Patent Application No. PCT/NZ2018/050076, filed May 30, 2018, claiming benefit from New Zealand Patent Application No. 732317, filed May 30, 2017, designating the United States.

BACKGROUND TO DISCLOSURE

The present disclosure relates to a method and system for processing containers, and in particular for containers for containing human consumable material.

Various types of beverages or products are stored in different types of containers for eventual consumption by consumers. Beverages and other products are typically filled in containers such as thermoplastic or glass liquid containers in an automated filling process. The product, the container, and container closure, such as a cap, must all be sterilized on the internal surfaces of the sealed container, or free from microorganisms, to provide the consumer with a safe product that has the respective quality attributes expected by the consumer.

Typically, containers can be filled with beverages in either a “cold-fill” process or a “hot-fill” process. The method of achieving sterilization within the container differs between the techniques, with each method having different benefits and cost implications.

The hot-fill process is less expensive and easier to maintain on a global basis, from an equipment and method perspective, but results in more expensive containers with little design freedom. The cold-fill process is typically much more expensive and difficult to maintain, but offers less expensive containers and more design freedom in the containers.

So called “hot-fill” containers are known in the art, therefore, as this technology is widely practiced globally. Plastic containers, such as PET (Polyethylene terephthalate) containers, are filled with various liquid contents at an elevated temperature, typically around 185° F. (85° C.). The product has been held in a batching process for a period of time prior to filling to ensure any microorganisms have been killed (referred to as pasteurization). The purpose is to kill microscopic bacterial life inside the liquid, ensuring the product stays fresher longer. After filling the product into the container, the container is sealed or capped and held at the filling temperature for a period of time, usually around 2-3 minutes. This is to allow the heated and sealed contents to sterilize the inside of the container. Following this the container is typically cooled to prevent heat damage to the containers, as they have generally only been ‘heat-set’ to withstand the hot fill temperature for a set period of time. Once the liquid within the container cools, the volume of the contained liquid reduces, creating a vacuum within the container that pulls inwardly on the side and end walls of the container. This in turn leads to deformation of the plastic container if it is not constructed rigidly enough to resist the vacuum forces. This need for rigid and strong containers leads to an inordinate amount of material being used as containers must be thick and strong.

Beverages are filled into hot-fill PET containers until they are almost full. The level where the beverage settles after filling is called the ‘fill point’ and this leaves a small amount of air above the fill point in the top of the bottle called the ‘headspace.’ When a hot-filled container cools the reduction in volume of the liquid results in an induced vacuum within the headspace.

Once a container is filled at a hot temperature, it is typically sealed via capping and quickly inverted. That is the container is laid on its side or completely turned upside down. This action allows the hot liquid to soak the upper end of the container and also the inside surface of the cap. After approximately 30 seconds the container is reinverted to its normal standing position and conveyed towards a cooler. After approximately 2-3 minutes it can be safely assumed that the container and its contents have been safely sterilized, and the container may enter the cooler unit. A cooler is usually a simple cold water shower tunnel that cools the bottles more rapidly to reduce the amount of time that the container is under the extreme stress of the hot contents, allowing the containers to then be labelled.

An alternative to filling a container with a heated liquid is to fill the container with a liquid, sealing the container and then subsequently applying heat to the container to sterilize the contents. Pasteurization is a common method of sterilizing a container and its contents. While similar to hot-filling the two main steps happen in reverse. First the container is filled and sealed, and then it is heated. This occurs in a pasteurization tunnel that heats the outer surfaces of the container until a targeted core temperature has be reached. This core temperature is calculated to achieve a desired PU count, the PU count being a unit of measurement that the industry uses to represent the cleanliness of the contents of the container. The container is then allowed to cool. During this process the internal pressure builds up significantly, leading to a plastic expansion in the container that is irrecoverable to a degree. As the liquid cools and shrinks the container is unable to completely recover the original size and so is left larger than when filled. The result is a build-up of vacuum within the container headspace.

The alternative to the hot-fill process of filling containers is the common method of ‘aseptic’ filling. To avoid hot-filling a container and therefore dealing with the consequences of cooling and allowing a build-up of vacuum, the containers are filled cold. Aseptic systems must, however, fill the containers in a completely aseptic or sterile environment. There is no provision for sterilizing the internal surfaces of the container and cap, as there is with hot-filling methods. Sterilized rooms and equipment process completely clean both the inside and outside surfaces of the containers, prior to filling a cold liquid into the container that has itself been sterilized to a degree through suitable flash pasteurization or other methodology. While this method of filling has been successfully implemented, the cost and expertise required to run such a filling lines are prohibitive barriers that cannot be overcome by many organizations. These environments are extremely difficult to control as they span large connected enclosures in which no contamination can take place, limiting access and serviceability. Staff expertise is required to be much higher, and this is often beyond the means of many manufacturers around the world. The filling system also needs to be stopped constantly and cleaned to ensure product integrity, as there is no useful method to detect contamination while the filling line is in production.

Aseptic systems therefore generally require the container to be blow-molded within the sterile environment, filled within the sterile environment, and sealed within the sterile environment. Sophisticated procedures are required to check sterility, unlike the hot-fill environment where sterility is much easier to predict based off simple temperature monitoring.

In summary, hot-filling a beverage is a very cost effective and reliable method to ensure a beverage will maintain a robust shelf-life and provide a way to easily sterilize the internal volume of a container. The containers may be supplied 'off-line' from independent channels. The biggest downside, however, to this technique is the resulting vacuum pressure that occurs within the container after cooling. Managing this vacuum requires heavier and therefore more expensive bottles. This counters the low cost appeal of hot-filling the containers to achieve pasteurization. Inversely, aseptic filling lines can employ very lightweight and inexpensive containers but are much more expensive and difficult to operate as the making, filling and sealing of the containers requires significant control and integration. Both of these systems counter their opposite advantages with their opposite disadvantages, leaving neither technology clearly superior.

SUMMARY OF THE DISCLOSURE

The present disclosure generally relates to the field of hot-filled beverage production and represents an improvement over previous disclosures by the same inventor disclosed in PCT/NZ2009/000079, US Pat Application 2017/0305581 and US Pat Application 2017/0008745, all incorporated herein in their entirety. More particularly this disclosure relates to providing a method of pasteurizing a container filled with a heated liquid and counteracting the vacuum pressures that build up within the container once it is filled and sealed and cooled. Another object of this disclosure is to at least provide the consumer or public with a useful choice.

In particular aspects of the present disclosure can provide for a 'hybrid' filling line that incorporates hot-fill methodology for filling and sterilizing the internal contents of a container, coupled to aseptic methodology to provide additional benefits of removing vacuum pressure and improving the quality of the beverage to typical aseptic quality.

An aim of some aspects of the present disclosure is to provide a method of upgrading or converting a typical legacy hot-fill line into the modern equivalent of an aseptic line at a much lower cost than investing in a typical aseptic line.

A further aim of some aspects of the present disclosure is to provide a hybrid filling line that is much cheaper to construct, and much easier to operate and manage, than prior art aseptic filling lines. The hybrid filling line may also provide for the blowing of containers to be either integrated within the filling line, as is typical in modern blow-fill operations (and mandatory in aseptic filling lines), or off-line from commercial bottle suppliers as is common with global hot-fill lines.

More particularly some aspects of the present disclosure is relate to providing a method of pasteurizing a container filled with a heated liquid and counteracting the vacuum pressures that builds up within the container once it is filled and sealed and cooled.

Some aspects of the present disclosure provide an additional method step of opening a sealed container under sterile conditions within an aseptic chamber to modify the internal pressure of the container after it has been cooled.

Some aspects of the present disclosure propose a composite technological method that utilizes aspects of both hot-fill and cold-fill technologies, to create a completely new and novel method of hot-filling beverage containers to achieve ultra-lightweight containers in a vastly simplified and cheaper operational environment to full aseptic systems.

In some aspects of this disclosure, rather than require an entire aseptic production line spanning the handling of empty containers, completely aseptic cooled beverage tanks, aseptic filling stations right through to an aseptic capper environment, the present disclosure proposes a "Hybrid Filling Line" comprising a singular, localized aseptic environment coupled to a standard hot-fill production line. The line functions much as a typical hot-fill production line but with the addition of an "Aseptic Line Converter Chamber" after the cooling tunnel. The purpose of the Aseptic Line Converter Chamber is to receive the containers from the cooler and clean their outer surfaces that are considered to be contaminated. Once sufficiently cleaned the containers are reopened, by either puncturing of the cap, removal of a plug, removal of a seal, opening of a valve or vent, or the mechanical removal of an extruded portion of the cap. This action takes place within the aseptic environment and once the seal is broken the internal vacuum force of the cooled container will draw gas from the aseptic environment into the immediately expanding headspace of the container. In one embodiment this gas comprising the atmosphere of the aseptic environment will be hepa-filtered Nitrogen, but could also be clean air, a cleaned or otherwise filtered gas, heated water vapor or a mixture of all three. The fluid introduced into the container may also be an aseptic or pasteurized fluid or liquid.

The Aseptic Line Converter Chamber environment ensures that no contaminants will enter the sterile conditions already present within the container. Because the internal surface of the container is already sterile and this is the only point of contact with a new environment it is much easier to control the sterility of this singular location than an entire facility.

The "aseptic environment" as described herein refers to the point at which the container is cleaned and located inside a more sterile environment. This process may start as early as in the cooling tunnel or entry tunnel to the Converter Chamber. The location at which the cap seal is broken however may be a highly controlled environment where all necessary surfaces, atmospheric particulates and incoming parts are partially or completely sanitized. Immediately prior to this location is the sterilization area where the filled, capped and cooled containers are sterilized or cleaned on their outer surfaces. Sterilization may include the entirety of the container's outer surfaces, or just the cap, or an otherwise localized portion of the container that will then be further isolated by a Perforator Device when unsealing and resealing occurs.

The sterilization area in one embodiment constitutes cleaning of the outer surfaces and or cap of the container with hydrogen-peroxide, or similar disinfectant. Not only will the containers in this area be sterilized but the sterilization tunnel can clean itself in the process vastly reducing the necessity for machine down time and costly cleaning.

An alternate embodiment can provide the outer surfaces of the container sterilized by a short pasteurization tunnel that rapidly heats the outside surface of the container. Pasteurizing in this way is significantly faster than traditional pasteurization as the core temperature of the container does not require temperature elevation and is of no concern as it is already sterilized. The purpose of using pasteurization in this method is to heat and disinfect the outer-most surfaces of the container, therefore being a rapid process. As the container has been heat-set to withstand initial hot-filling, the container material is already heat-set to withstand the second heat treatment of the present disclosure.

This embodiment of the present disclosure may employ sterilization by heated steam. An open or enclosed tunnel that is heated via steam will disinfect all the present surfaces whether on the container or a part of the tunnel and integrated machinery also, and therefore provides ready acknowledgement of non-contamination status by temperature gauge monitoring.

In another embodiment of the disclosure, the outer surface of the cap and or container and or Aseptic Line Converter Chamber environment may be cleaned by means of Electron Beam radiation or gaseous sterilizing agent such as hydrogen peroxide.

In another embodiment the outer surface of the cap and or container and or Aseptic Line Converter Chamber environment may be cleaned by means of Ultraviolet Radiation. Ultraviolet Radiation may be generated in an Ultraviolet laser that is outside the respective container. The radiation may be introduced into the Aseptic Line Converter Chamber environment by means of reflectors.

Aspects of this disclosure also relate to any one or more of the following:

A method for processing plastic containers comprising steps of any one or more of:

- i. Providing a container suitable for hot-filling;
- ii. Filling the container with heated or heatable liquid including water;
- iii. Sealing the container with a seal or cap to close the container;
- iv. Cooling the liquid in the sealed container to create a first headspace pressure within the container;
- v. Enclosing the cooled and sealed container within an open aseptic converter chamber, wherein the converter chamber comprises:
  1. A sanitized environment;
  2. Means for maintaining the sanitization of the container within the converter chamber;
  3. Means for perforating or opening the cap or seal of the container within the converter chamber;
  4. Means for sealing the opening or perforation within the converter chamber; and
  5. Means for transporting or conveying multiple containers within the converter chamber.
- vi. Creating an opening in the seal or cap of the container within a sanitized environment of a perforator means or device for creating an opening in the seal or cap;
- vii. Increasing the first headspace pressure to a second headspace pressure within the container by the introduction of a sanitized fluid to the headspace of the container;
- viii. Resealing the container within a sanitized environment of a sealing means or device;
- ix. Transporting or conveying the sealed container from the sanitized environment of the converter chamber.

The sanitized environment of the perforator or hole creating means may be shared with the sanitized environment of the converter chamber.

The sanitized environment of the perforator or hole creating means may comprise an additional supply line providing an additional sanitized fluid.

The heated or heatable liquid may include a sweetener.

The heated or heatable liquid may include flavour ingredients.

The second headspace pressure may be between 0.0003 psi and 0.001 psi.

The additional sanitized fluid may include a sweetener.

The additional sanitized fluid may include flavour ingredients.

The additional sanitized fluid may include nitrogen.

The sanitized environment of the sealing means may be shared with the sanitized environment of the converter chamber.

The sanitized environment of the sealing means may comprise an additional supply line providing an additional sanitized or pressurized fluid.

The additional sanitized fluid may include a sweetener.

The additional sanitized fluid may include flavour ingredients.

The sealing means may provide a pressure seal against a surface of the sealed or capped container and the additional sanitized fluid pressurizes the container creating a headspace pressure between about 0.001 psi to 15 psi.

The sanitized environment of the converter chamber may be shared with both means for perforating or creating a hole in the container and for sealing the container.

Both means for perforating or creating a hole and sealing the container may be pressurized and sanitized within a sealed environment increasing the headspace pressure above 0.001 psi.

The method may include conveying containers between an entry port, devices for sanitizing, perforating or creating a hole in the sealed container and sealing the hole, and an exit port.

The means for perforating or opening the cap or seal may include piercing the cap by means of mechanical puncture force.

The sealing means may increase a second headspace pressure to a third headspace pressure.

The perforation means or device may be a rotary device.

The sealing means or device may be a rotary device.

The method may include blow-moulding the container.

The method may include initiating cleaning or sanitizing of the container before the entry port to the converter chamber.

The means for maintaining the sanitization of the container may comprise at least one of a steam tunnel, hydrogen peroxide spray, flash heat or pasteurization, or ultraviolet light or radiation.

The above method may comprise any one or more, or any combination of the stated steps. Further, any one or more of the steps may vary in order.

According to another aspect there is provided a system or apparatus for processing plastic containers comprising structure and control means configured to:

- i. Provide a container suitable for hot-filling;
- ii. Fill the container with heated or heatable liquid including water;
- iii. Seal the container with a seal or cap to close the container;
- iv. Cool the liquid in the sealed container to create a first headspace pressure within the container;
- v. Enclose the cooled and sealed container within an open aseptic converter chamber, wherein the converter chamber comprises:
  1. A sanitized environment;
  2. Means for maintaining the sanitization of the container within the converter chamber;
  3. Means for perforating or opening the cap or seal of the container within the converter chamber;

4. Means for sealing the opening or perforation within the converter chamber; and
5. Means for transporting or conveying multiple containers within the converter chamber.

vi. Create an opening in the seal or cap of the container within a sanitized environment of a perforator means or device for creating an opening in the seal or cap;
vii. Increase the first headspace pressure to a second headspace pressure within the container by the introduction of a sanitized fluid to the headspace of the container;
viii. Reseal the container within a sanitized environment of a sealing means or device;
ix. Transport or convey the sealed container from the sanitized environment of the converter chamber.

BRIEF DESCRIPTION OF THE DRAWINGS

The accompanying drawings, which are incorporated herein and form part of the specification, illustrate various, non-limiting embodiments of the present invention.

DETAILED DESCRIPTION OF THE DISCLOSURE

Figure 1:
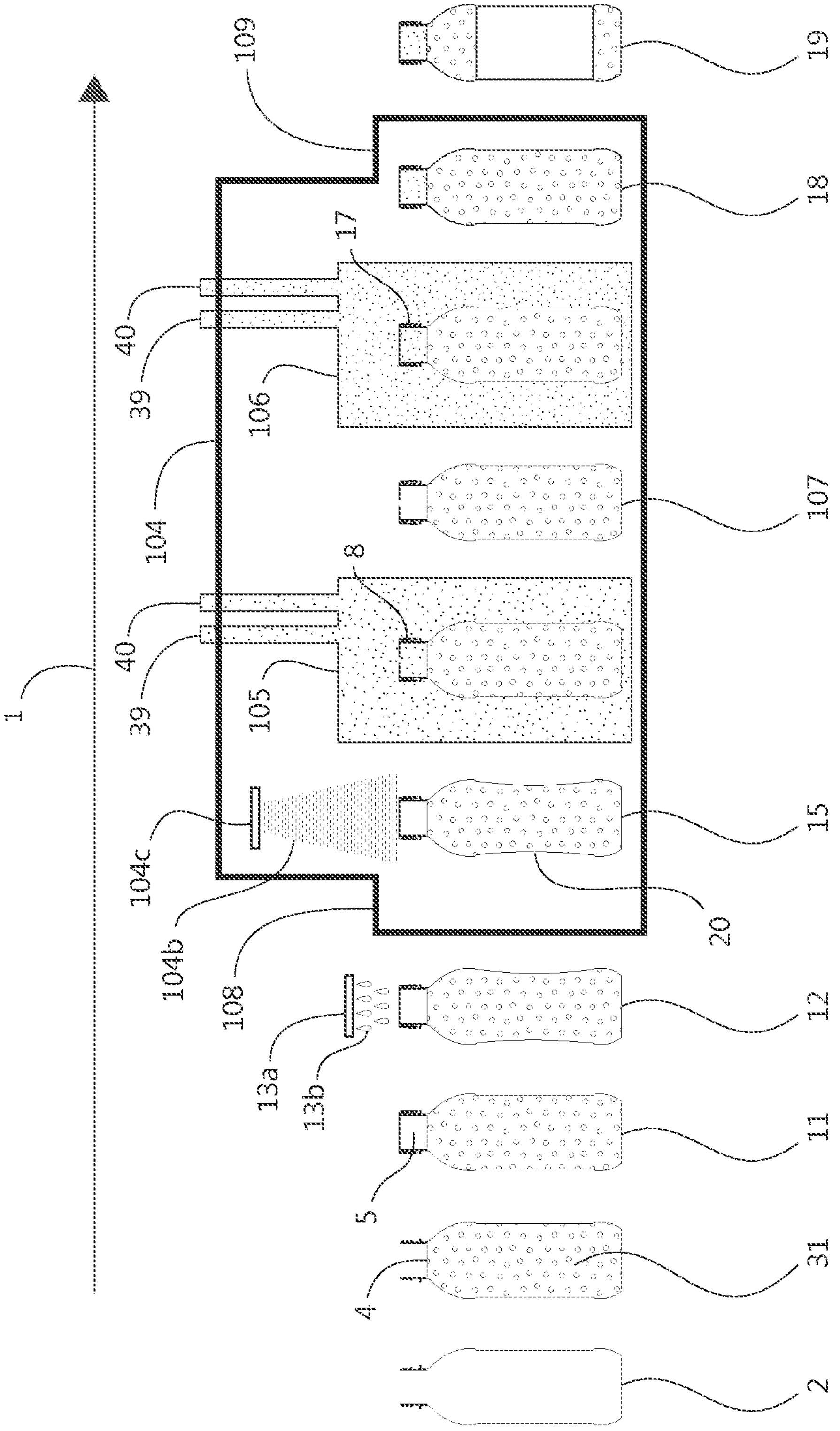
FIG. 1 depicts an exemplary production line according to some embodiments.

FIG. 1 shows a basic overview of the present disclosure. A simplified production line is illustrated progressing in direction of left to right (1). The production line may firstly include manufacture of the bottle through typical blow-moulding methods for producing heat-set or 'hot-fill' bottles (not shown). An empty container (2) is filled with a hot beverage (31) around 185 degrees Fahrenheit (85 degrees Celsius), although this may be lower or higher depending on the required pasteurization level, and the container is capped or sealed (11) completely sealing the container. A headspace (5) typically exists within the sealed container above the fluid level (4) of the filled liquid. At this point the container is typically inverted, or placed onto the side for example, to ensure the hot internal liquid contacts the inside surface of the cap and headspace surfaces for long enough to ensure the inner surfaces are completely sterilized by the hot liquid. After sufficient time for pasteurization of the internal surfaces of the container has passed, between approximately 1-5 minutes depending on the temperature of the liquid, the filled and sealed container is then transported to a cooling unit or tunnel where the temperature of the container is rapidly reduced by a cooling fluid (13*b*) over the outer surface or by similar cooling means.

Once the container has been sufficiently cooled (12) and a vacuum (20) has typically built within the container from the reduction in volume of the liquid, the container is then conveyed or moved from the Hot Fill processing portion of the Filling Line into the Aseptic processing portion of the Filling Line. Upon entry to the aseptic processing portion of the line the container will have a first internal pressure within the headspace, typically a vacuum.

The container is moved through the Entry Port (108) and into an Aseptic Line Converter Chamber (104), typically comprising an aseptic environment, wherein the outside surfaces of the container may be cleaned (15) by Sterilization or Pasteurization Cleaning Means (104*b*) emitted from a Sterilization Device (104*c*) as the outer surface of the container has not been sterilized in the same manner as the inner surfaces have been by the heated product filled into the container. Embodiments may include singular or multiple methods of the cleaning and may provide but are not limited to; steam tunnels, hot water sprays, hydrogen peroxide disinfectants, heated sanitization, and ultraviolet radiation techniques. The Hot Fill processing portion of the Filling Line does not comprise a completely clean environment, so it is most likely contaminated. The container may of course be cleaned initially outside the Converter Chamber, but this is generally only completed once the container has been moved into the aseptic environment of the Converter Chamber. When verifiably cleaned the container engages with a Perforator Means or Device (105) and the cap or seal may be perforated or otherwise opened (8) to allow for a first vacuum modification. At this point the headspace vacuum may be neutralized, or at least adjusted to the ambient pressure within the Perforator Means or Device. This is generally the same ambient pressure as found within the Converter Chamber and provides a second headspace pressure within the opened container. The second headspace pressure is generally higher than the first headspace pressure.

Following the step of repressuring the headspace, the container engages with, or is conveyed or otherwise transported (107) to a Sealing Means or Device (106) and the container may then be resealed (17). Depending on the particular method utilized, resealing can take place by applying a new seal, inserting a plug or localized melting of the cap to close a small opening. The perforation and/or resealing of the container may typically be conducted within a rotary unit to account for rapid speed of production. Just prior to this point of resealing, the headspace may remain neutralized or even be pressurized positively to a third headspace pressure to account for further cooling or contraction of the beverage inside if the container has entered the aseptic environment at a slightly elevated temperature. For example, the container liquid contents may be at a temperature of approximately 35 degrees Celsius upon entry to the Aseptic Converter Chamber, and the liquid will continue to contract after exit from the Filling Line often to as low as 4 degrees Celsius. If a positive pressure can be induced during processing in the Aseptic Converter Chamber, then this anticipated or calculated future vacuum build will be prevented. The container may exit the Aseptic Converter Chamber with a positive pressure that then reduces as the liquid contents cool further. Any additional positive pressure residual in the container will also help to improve container qualities such as top load resistance.

The container is now vacuum modified (18) upon exiting the Converter Chamber and conveyed through the Exit port (109) to be labeled (19), and then packaged for distribution. As there is no requirement for the container to withstand a vacuum force after leaving the Filling Line, the container may be significantly light-weighted and utilize multiple design variations. Importantly, a typical Filling Line may be modified without the need to change existing moulds or designs. Existing Hot Fill bottles may simply be produced with a lighter weight preform and processed on the Hybrid Filling Line, where the heated liquid introduced with legacy Hot Fill equipment first cools to create a vacuum within legacy Cooling Tunnel equipment. The introduction to the line of the Converter Chamber effectively removes the vacuum within the container in an aseptic environment, in order to keep the pasteurized contents from being compromised by introduction of non-aseptic elements.

Figure 2:
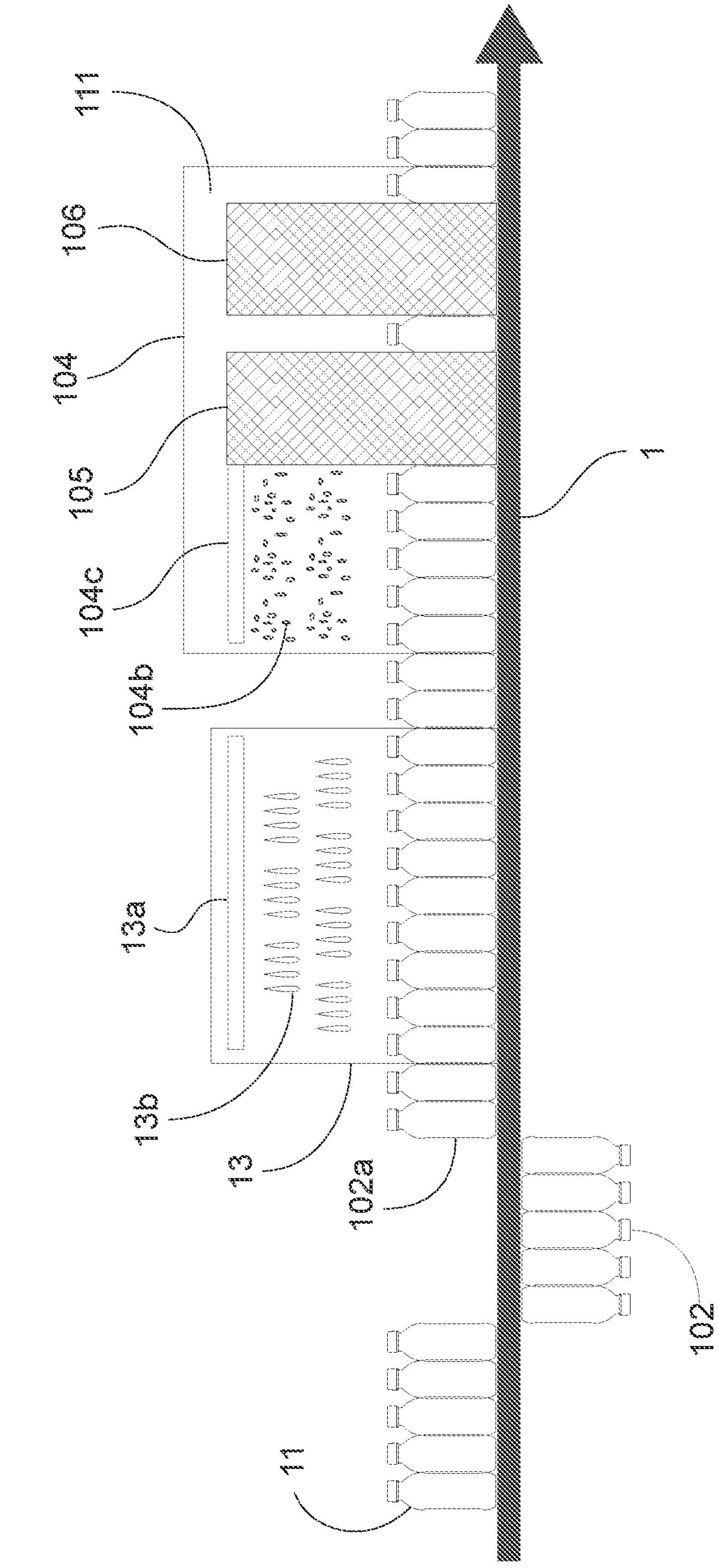
FIG. 2 depicts another exemplary production line according to some embodiments.

FIG. 2 shows much the same method as disclosed in FIG. 1. A recently hot-filled and capped container (11) is inverted (102), then reinverted (102*a*). The container then enters a standard cooling device (13) where cooling fluids (13*b*) are sprayed over the outside surface of the containers from outlets (13*a*). Once cooled the containers may be conveyed or moved to enter the aseptic environment (111) of the Aseptic Converter Chamber (104). The Sanitizer device (104*c*) dispenses Sanitization Means (104*b*) over the outer surfaces of the containers. The cleaning fluid could be but is not limited to hydrogen-peroxide. This method of sterilization can be combined with, but is not limited in combinations with, any of the of the other sterilization methods disclosed in the current disclosure. For example, the Sanitation means (104*b*) could be steam pumped into the Aseptic Line Converter Chamber (104) that fills the system and is monitored with temperature gauges. A temperature maintained within the chamber above 85° C. would ensure a sanitized condition. These temperature gauges can effectively and reliably guarantee the integrity of the aseptic environment within the chamber (104) and is a vastly more efficient and reliable method of creating a hygienic atmosphere than traditional aseptic methods. In this embodiment they reach the Perforator means or device (105) for creating a hole in the cap or seal while in the aseptic environment of the Aseptic Converter Chamber. Following the creation of an opening in the cap or seal, the first headspace pressure within the container is raised to a second headspace pressure and the container then engages with a Sealing means or device (106). Further pressure adjustment may occur within the Sealing means or device in order to raise the second headspace pressure to a third headspace pressure. Once all pressure modification has occurred the containers leave the aseptic environment and are ready for processing.

Figure 3:
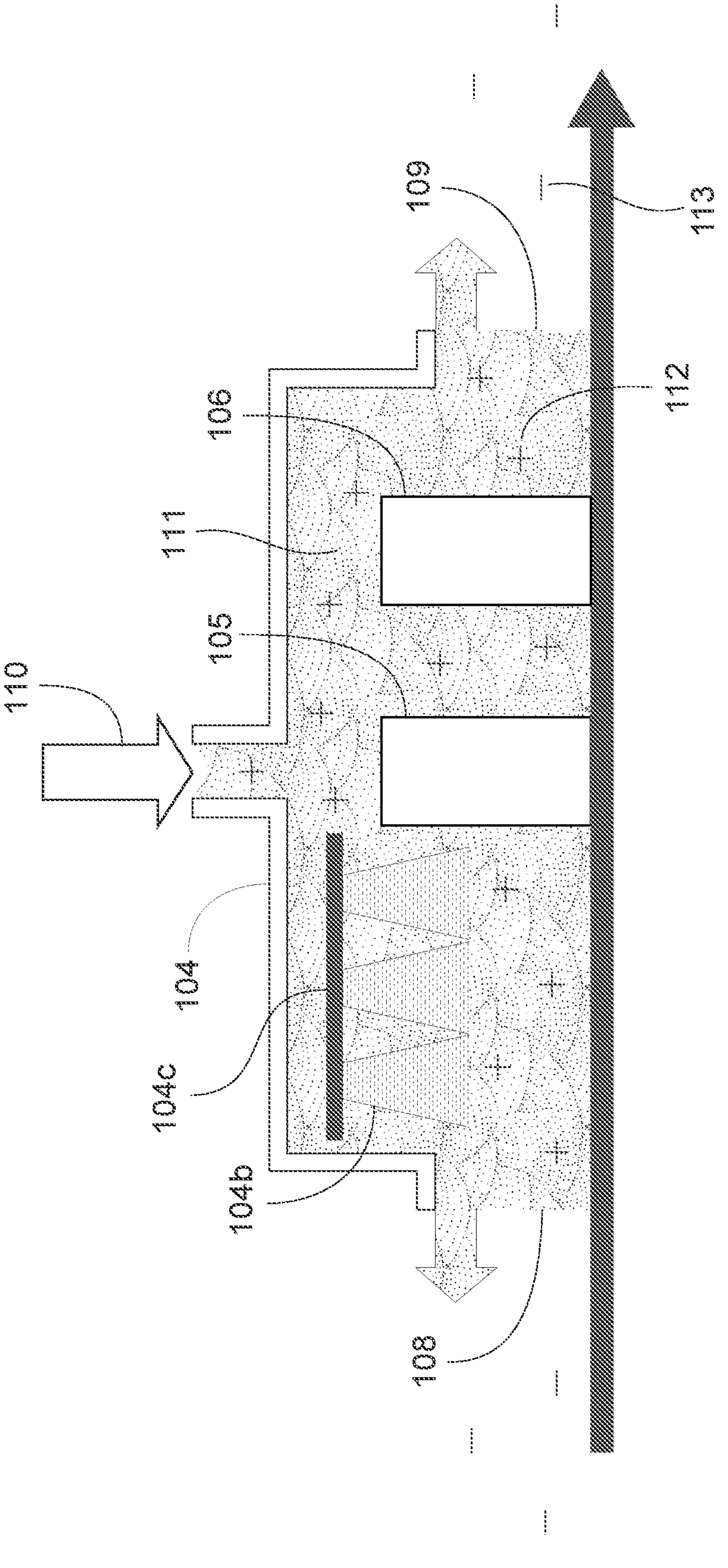
FIG. 3 depicts an exemplary aseptic converter chamber according to some embodiments.

FIG. 3 shows in greater detail the steps within the Aseptic Converter Chamber disclosed in the present disclosure. The Aseptic Converter Chamber (104) is not a sealed or closed Chamber, but is an open chamber comprising an entry port or tunnel (108) and an exit port or tunnel (109). HEPA-filtered air, nitrogen or other Filtered Gas may be introduced to the Converter Chamber through a supply line (110) causing a slightly raised ambient pressure (112) to escape via the entry or exit ports towards the ambient pressure (113) outside of the Aseptic Converter Chamber. This pressure should be considered as not being 'pressurized', but more as an ambient pressure that is slightly raised according to the size of the entry and exit ports. This pressure increase is typically experienced in the ambient atmosphere of the globe depending on ambient temperature range. Fluid, for example Nitrogen gas or air may be supplied through Terminal HEPA (High-efficiency particulate arrestance) filters in the supply line into the Converter Chamber. The principle of operation is to ensure no fluid from outside the open Converter Chamber may enter via the entry or exit ports accommodating container conveyance. The supply of gas under slight pressure causes the gas within the Converter Chamber to flow out the ports, preventing ingress of other outside ambient gas.

Air flows downward within the Chamber and then out the ports as desired, and to achieve this a typical minimum positive pressure above ambient recommended is 2.5 Pascal (0.01 inches of water). It will be appreciated therefore that positive pressurization within the Converter Chamber may be of the order of approximately 0.000362594 psi. It is anticipated therefore that the pressurization within the Converter Chamber of the present disclosure is of the order of about 0.0003 to 0.001 psi only.

The converter Chamber comprises a Sterilizing means or device (104*c*), in this embodiment emitting steam as a sterilizing means (104*b*) in a steam tunnel, although the means of sterilization may be of many different methods, without departing from the scope of the disclosure. Following cleaning of the critical external surfaces of the sealed container, the Perforator means or device (105) will create an opening in the container and raise the first headspace pressure to a second headspace pressure that may be approximately 0.0003 to 0.001 psi above the ambient air pressure outside the Converter Chamber. Following this the container is moved to a Sealing means or device (106). The Sealing means may typically be of a rotary means, as optional steps may now be included such as pressurizing the container headspace prior to sealing. Typically, the container headspace pressure may be elevated to a third headspace pressure that is between 0.5 psi to 15 psi above ambient pressure within the Converter Chamber or Filling Line. Alternatively, the Perforator Means or Device may also be of rotary design and it also may include additional steps while creating a hole in the cap or seal, such as introducing an additional fluid into the container such as an aseptic gas or liquid, or combination thereof and may also pressurize the headspace well above ambient pressures.

In the event or embodiment whereby a forced pressurization of the headspace is created, then at least the Sealing means or device (106) will preferentially seal tightly against the cap or container in order to introduce an amount of fluid well above ambient pressure within the open pathway of the Aseptic Converter Chamber. However, in other embodiments a dose of liquid nitrogen gas may be introduced immediately prior to, or within the operation of the sealing means that would also create a pressurized container upon exit, and the sealing device would not necessarily have to create a sealed environment against the container while sealing the hole in the cap within the Converter Chamber.

Figure 4:
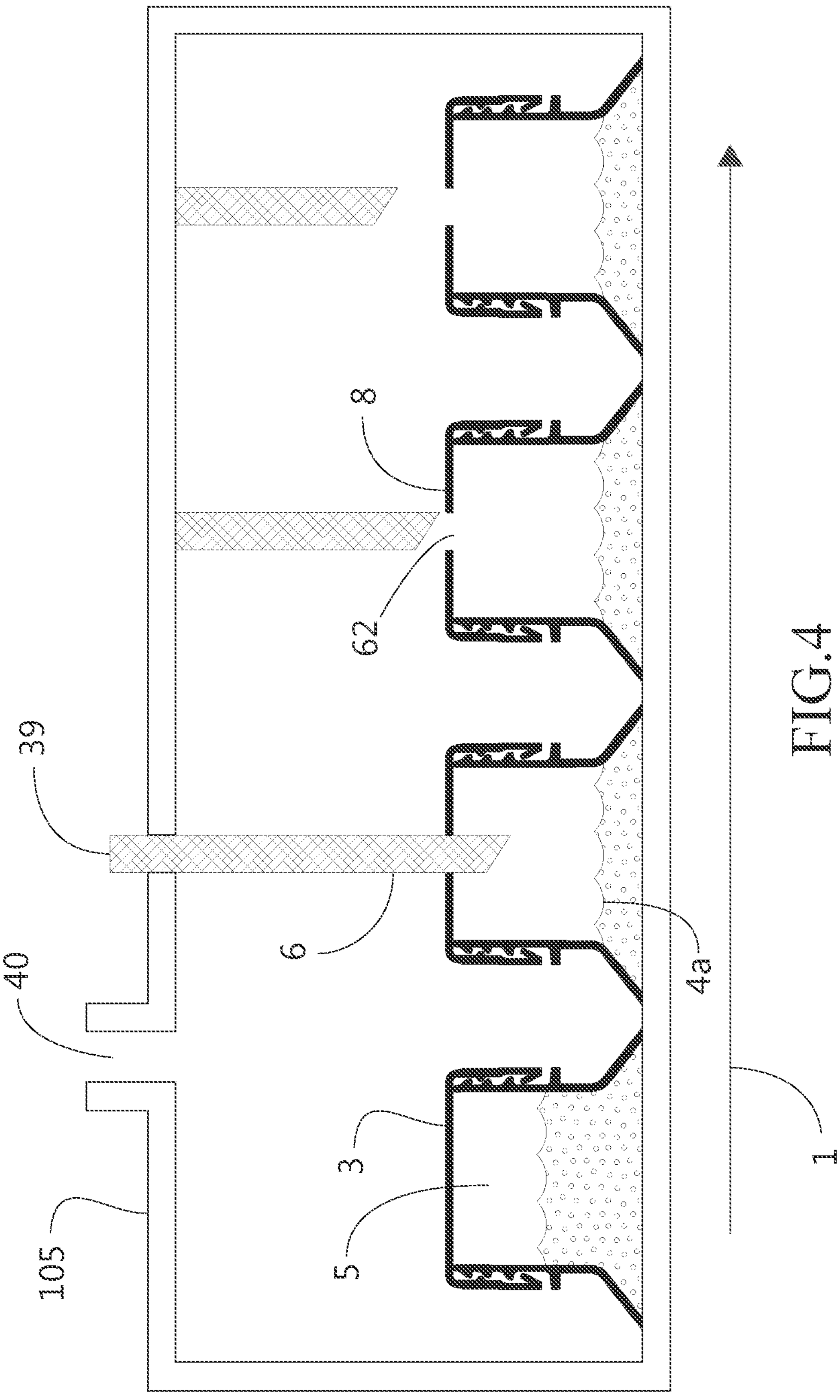
FIGS. 4-8 depict exemplary perforators according to some embodiments.

FIG. 4 shows in more detail one preferred embodiment of the Perforator means or device (105) of the present disclosure. Shown is a simplified production line progressing in direction from left to right (1). A filled container has a cap or seal (3) enclosing a previously pasteurized headspace (5) enters the Perforator means or device having a first headspace pressure. The Perforator may be an open system within the confines of the Converter Chamber, and therefore share the same gaseous environmental conditions or may alternatively include a separate Secondary fluid supply line (40) for introduction of a different fluid mixture than found within the Converter Chamber. For example, the Converter Chamber may have an environment of HEPA filtered air, but the environment within the Perforator may be HEPA filtered Nitrogen gas only, introduced through a Secondary fluid supply line (40). A Perforator mechanism (6) may pierce the cap of the container providing for the first headspace pressure to communicate with the environment within the Perforator. There may be many methods of perforation and in this embodiment a mechanical puncture is utilized. This may be further assisted by means of ultrasonic cutting to decrease cutting time and offer other production line benefits such as increase cutter part lifespan and guaranteeing puncture consistency.

In this embodiment the fluid level within the container lowers (4*a*) as the Perforator mechanism pierces the container cap due to the inflow of aseptic fluid or gas from the environment within the Perforator being at a higher pressure to that of the pressure within the container. Upon perforation therefore the first headspace pressure is replaced by a second, raised or higher headspace pressure through the additional fluid material, which could for example be Nitrogen. In this embodiment the Perforator mechanism then retracts leaving a hole (62) in the now perforated cap (8).

Figure 5:
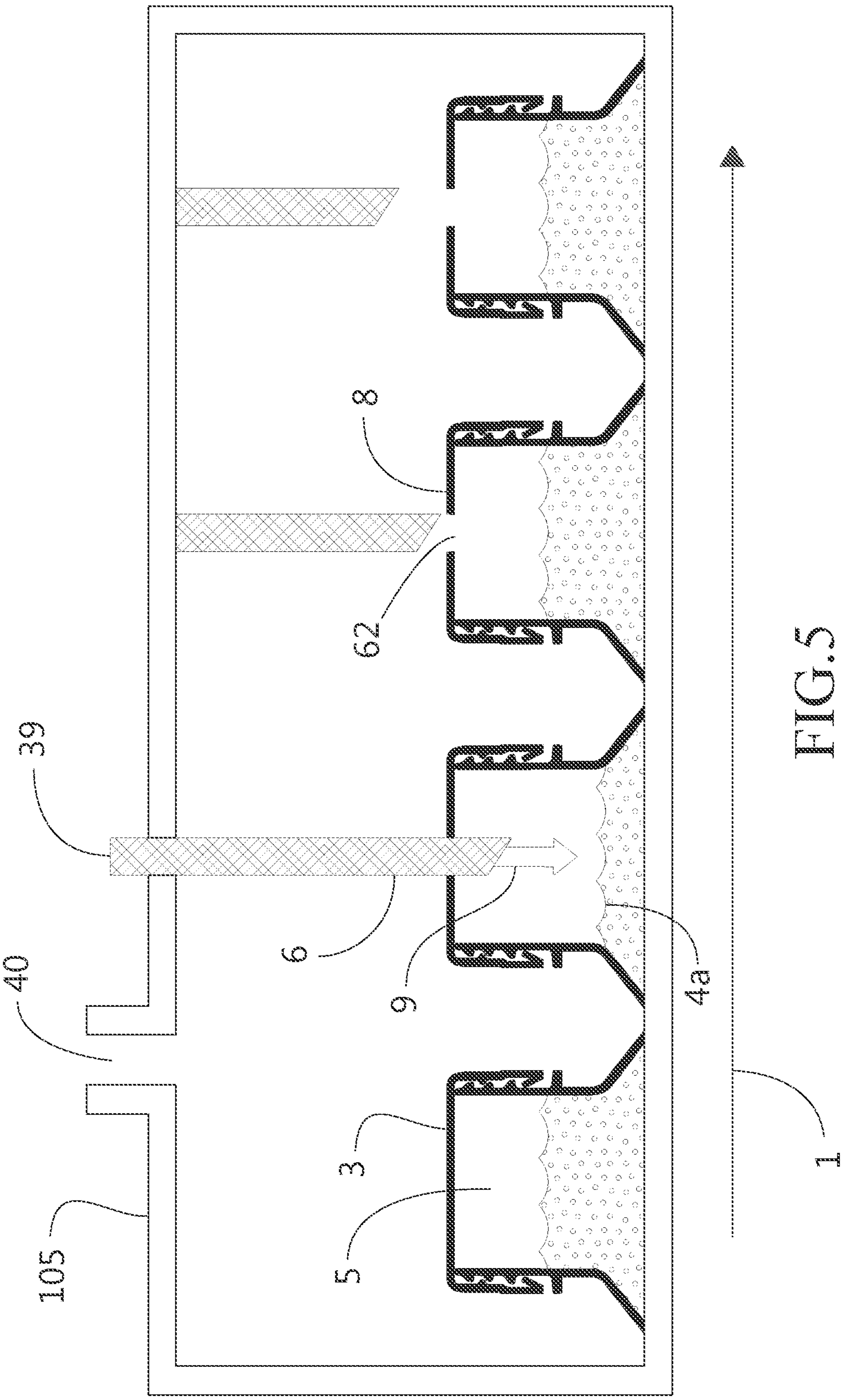

FIG. 5 shows a further embodiment of the Perforator means or device (105) of the present disclosure. An additional Primary fluid supply line (39) may be associated with the perforation device for injection of aseptic fluid into the headspace of the container following perforation. After the Perforator mechanism (6) pierces the cap of the container the first headspace pressure may be raised to a second headspace pressure. Following this, the aseptic fluid may be introduced to raise the depressed fluid level (4*a*) to a higher level also, thereby reducing the headspace volume in addition to the raising of headspace pressure.

This embodiment has the added benefits of providing for the addition of aseptic or pasteurized ingredients to the product. This has a particular advantage over existing Hot-Fill systems. With the present disclosure, products may be prepared through the hot-filling of heated water, or heated water and sweetener such as sugar, to first to pasteurize the internal surfaces of the container, and then during the perforation or sealing procedures may have important additional ingredients added that have not been subjected to the same rigorous heat treatment. For example, aseptic quality flavourings or product ingredients and components may be added during the aseptic phase through a Primary fluid supply line (39) thus providing for aseptic quality products to be generated without utilizing existing aseptic filling lines. As a result, not only is the vacuum removed from a hot-fill container, allowing lower weight containers, but the quality of the product is improved to be competitive to aseptic product.

In this embodiment an aseptic fluid liquid (9) may be introduced into the container via the Perforator mechanism. However, this insertion of aseptic fluid liquid or gas may be introduced through another means or device immediately following the perforation of the cap by the Perforator mechanism. The Primary aseptic fluid supply line (39) will provide the aforementioned aseptic fluid to the system and onto into container. In this embodiment the fluid level within the container lowers (4*a*) as the Perforator mechanism pierces the container cap due to the inflow of aseptic gas from the environment immediately outside the container being at a higher pressure to that of the pressure within the container. In further embodiments the perforation of the cap may be designed so the Perforator mechanism ensures a hermetic seal with the cap as perforation occurs. In this embodiment the Perforator mechanism then retracts leaving a hole (62) in the now perforated cap (8) but with the headspace raised from a first pressure to a second pressure, and the fluid level raised within the headspace also as a result of the addition of aseptic fluid to the contents.

Figure 6:
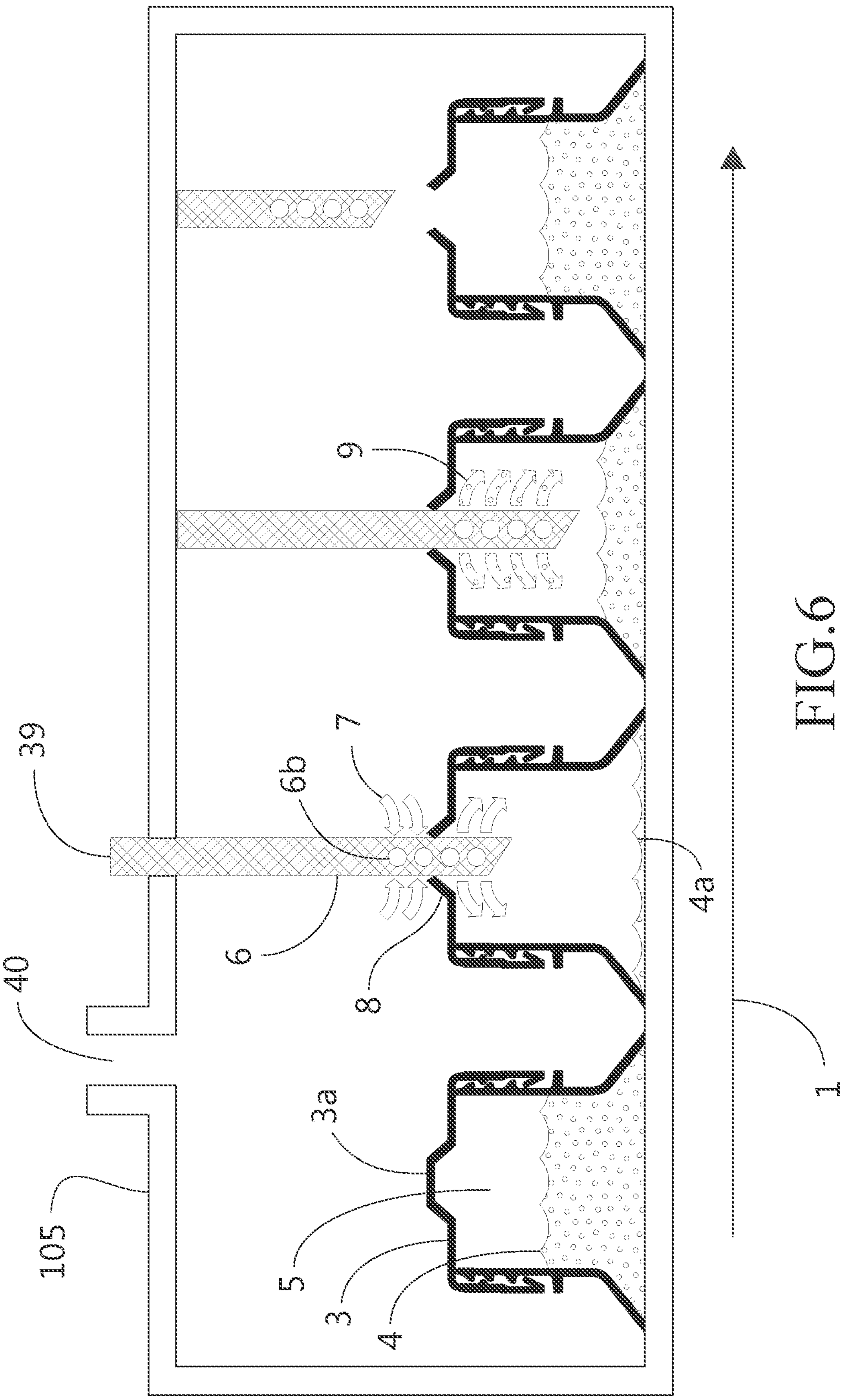

FIG. 6 shows an embodiment of the present disclosure much like FIG. 5 however the cap or seal (3) has a raised or otherwise manipulated portion of geometry (3*a*) located where the Perforator mechanism (6) is designed to perforate the cap. In this embodiment the Perforator mechanism is configured to have additional outlets or openings (6*b*). Once perforation of the cap is started (8) these openings then provide for a multitude of functions. They allow for the transfer of ambient aseptic fluid (7) from the Perforator environment immediately outside of the container, which in this embodiment is a gas, to initiate even prior to the Perforator mechanism reaching far enough to begin aseptic fluid (9) injection which is made available from the Primary fluid supply line (39) which enters the Perforator means or device (105) from a previously aseptically sanitized source outside of the Perforator means or device system. As the Perforator in this example is providing at least two different fluids to the headspace, the process may occur much faster.

Figure 7:
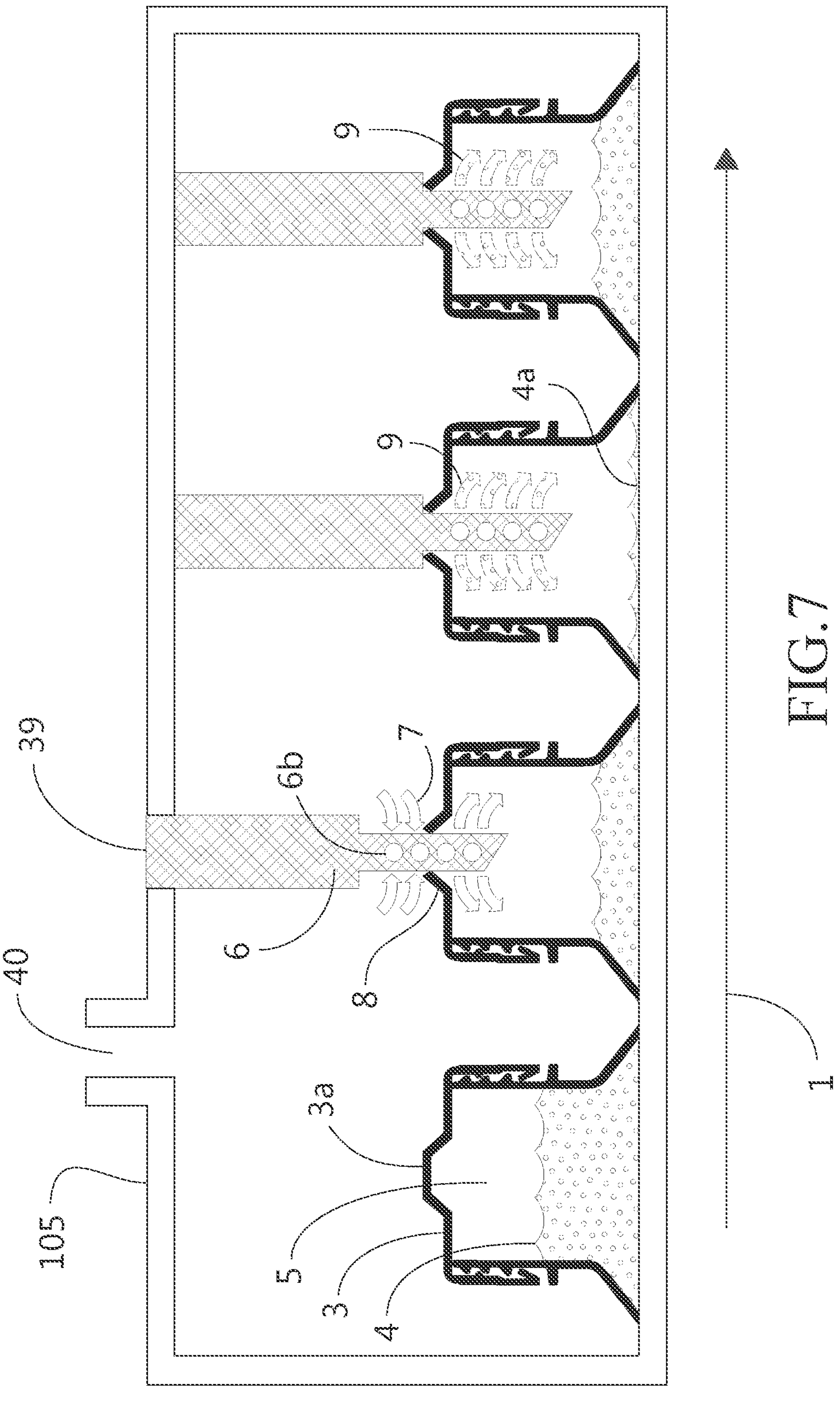

FIG. 7 shows the diameter of the mechanism (6) above the holes (6*b*) may be increased to further assist aseptic fluid injection to be conducted quickly. In this embodiment this causes the fluid level (4) to drop (4*a*) as the vacuum within the container headspace (5) is neutralized by the inflow of aseptic fluid present in the chamber (7). The container is then filled with a second injected aseptic fluid (9) supplied from a Primary supply line (39) thereby raising the level of the fluid level again within the container. When the container is filled with the predetermined amount of Aseptic fluid the Perforator mechanism retracts as shown in the final step of the drawing.

Figure 8:
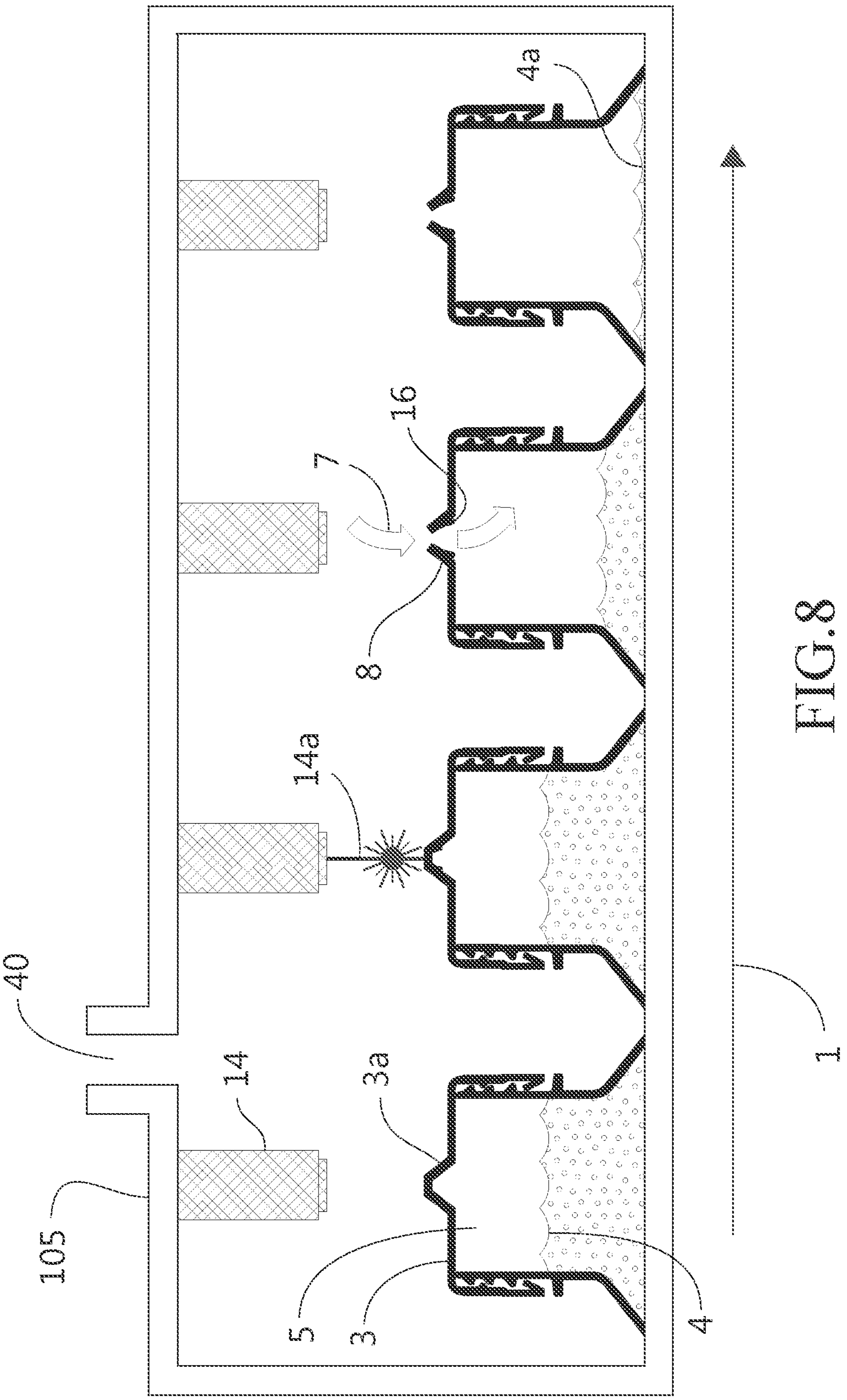

FIG. 8 shows in more detail a further embodiment of the Perforator means or device (105) of the present disclosure. A simplified production line progressing in direction from left to right (1). A filled container has a cap or seal (3) enclosing a previously pasteurized headspace (5) defining a first fluid level (4) enters the Perforator means or device area (105). The cap may have a deliberately raised portion of redundant material (3*a*) designed to control the flow direction of any melted material (16) that runs away from the site of laser perforation for consistent melting control. In this embodiment a Laser emitter (14) emits a Laser cutting beam (14*a*) which quickly perforates the cap (8). This allows an already present aseptic fluid of liquid or gas (7) to be introduced into the container through the perforation in the cap. In this embodiment the vacuum previously present within the container is then neutralized and the fill level settles at a new level (4*a*).

It is further envisaged that the Perforator means or device could provide a hermetically closed chamber to form a seal against the cap or neck finish of the container. This would provide a seal between the gaseous environment of the open Converter Chamber and the fluid environment of the Perforator means or device if required, particularly if a different fluid to the fluid contained in the Converter Chamber is to be injected.

Figure 9:
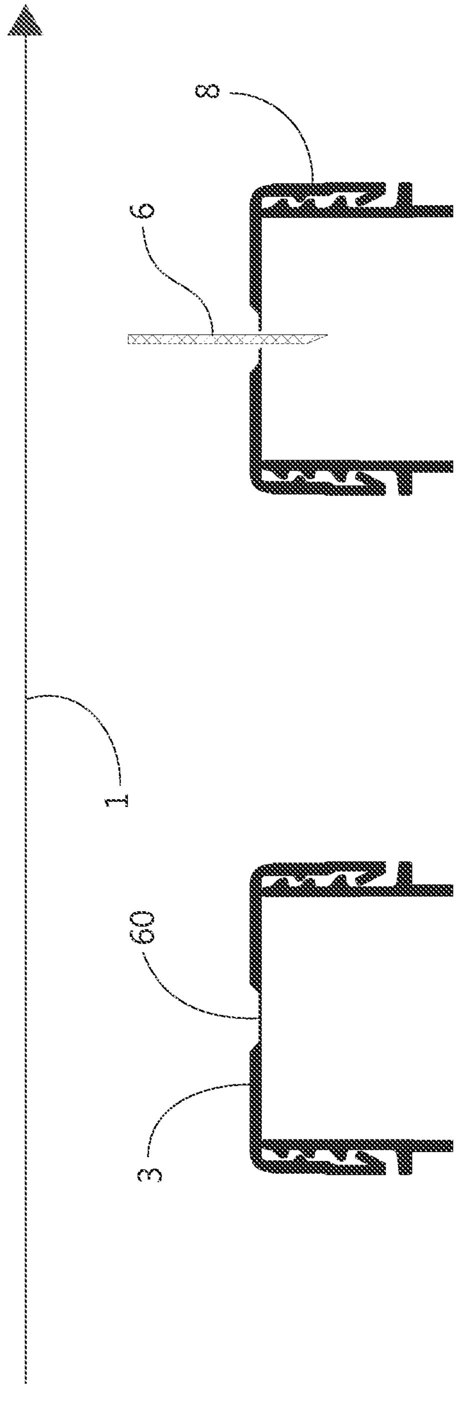
FIGS. 9-10 depict exemplary caps according to some embodiments.

FIG. 9 shows an embodiment of a detailed segment of the present disclosure. Time along the production line is progressing in direction of left to right (1). In this embodiment a cap (3) has a thin segment (60) designed in its center. This designed weak spot only needs to temporarily seal the container during the first stage of hot-fill pasteurization. Upon filling, capping, cooling, cleaning and reaching the Perforator means or device, this area is targeted by the puncture mechanism (6) to allow aseptic gas or fluid or liquid to flow through the opening (62) to modify the vacuum state within the container.

Figure 10:
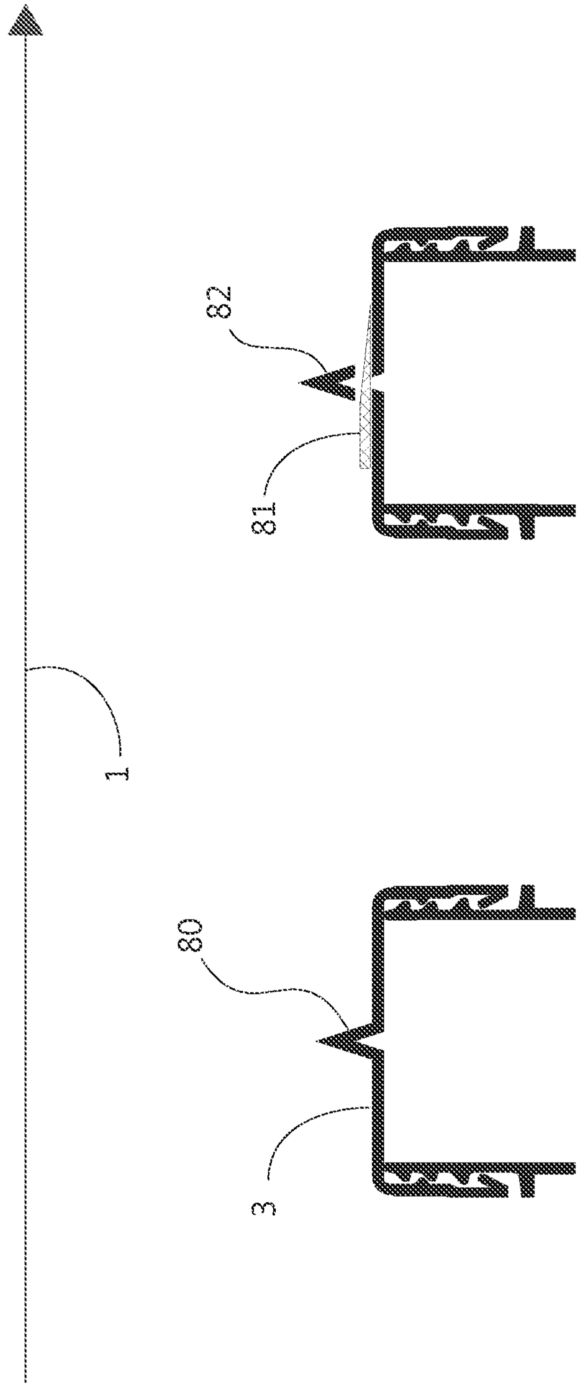

FIG. 10 shows an embodiment of a detailed segment of the present disclosure. Time along the production line is progressing in direction of left to right (1). In this embodiment a cap (3) has an upwardly protruding section (80) of the cap wall. Upon filling, capping, cooling, cleaning and reaching the Perforator device or means this thin seal is targeted by a cutting mechanism (81) that dislodges the protruding section (82) and then allows aseptic gas to flow through the opening from the Aseptic environment outside of the container.

Figure 11:
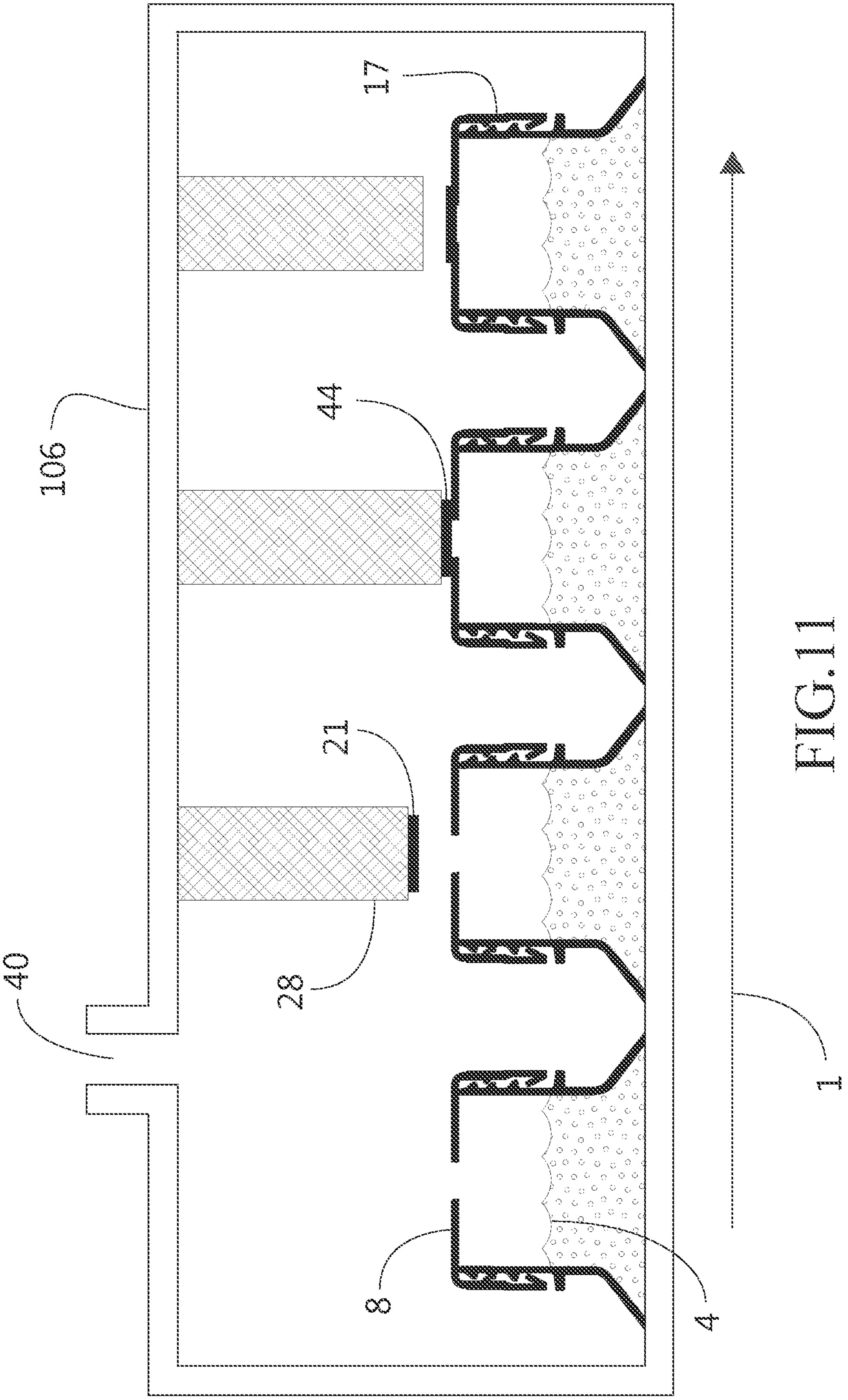
FIGS. 11-14 depict exemplary sealers according to some embodiments.

FIG. 11 shows in more detail a potential embodiment of the Sealing means or device (106) of the present disclosure. Shown is a simplified production line progressing in direction from left to right (1). A filled container is received following perforation and a raising of the first headspace pressure to a second headspace pressure. The container has a perforated cap (8) and engages with the Sealing means or device. A Seal applicator means (28) applies a seal (21) to the cap by means of heat, ultrasonic welding, glue or otherwise thereby resealing the container (44), in order to maintain the second headspace pressure. The Seal applicator then disengages from the resealed container cap (17).

It will be further appreciated that the Sealing means or device may include additional fluid supply lines also. For example, the Sealing means may be configured to provide a pressure seal against the cap or neck finish or other part of the container and so the Secondary fluid supply line (40) may be configured to provide an aseptic pressurizing gas. Alternatively, a supply line may be additionally configured to supply an aseptic fluid into the headspace such as a liquid nitrogen drop immediately prior to sealing. This would provide for an increase in pressure within the headspace from the second headspace pressure to a third headspace pressure a short time after the container is sealed and released from the Sealing means or device.

Figure 12:
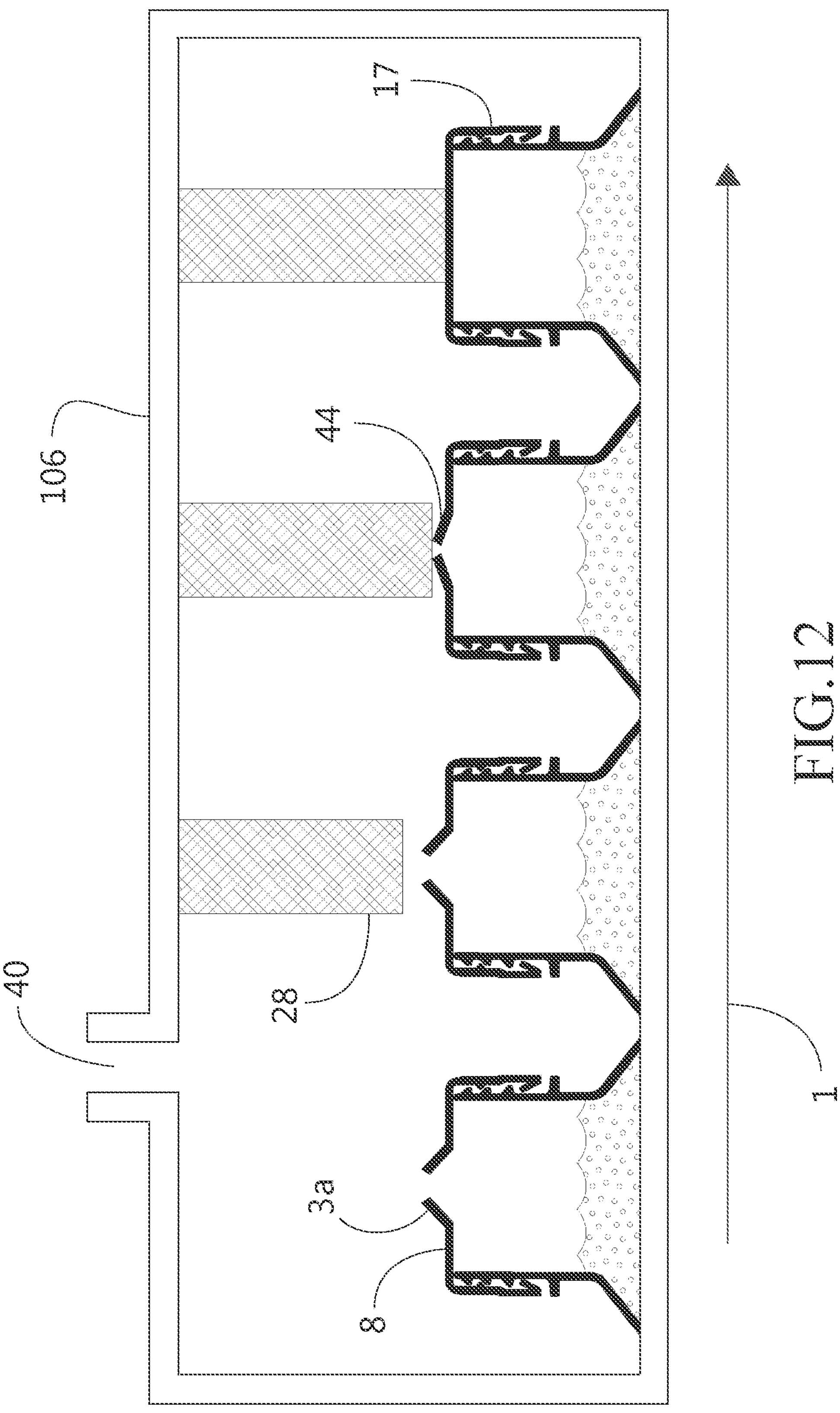

FIG. 12 shows an embodiment of the present disclosure much like FIG. 11 however in the embodiment the Seal applicator (28) does not provide a separate seal. In this embodiment the seal applicator manipulates specifically designed material on the cap (3*a*) to reform and reseal the cap. By means of thermal heat or ultrasonic welding techniques the Seal applicator melts, rearranges and thereby reseals (44) the container cap (17). This figure is also similar to FIG. 11 in that it shows a Secondary fluid supply line (40) that enters the Sealing means or device (106).

Figure 13:
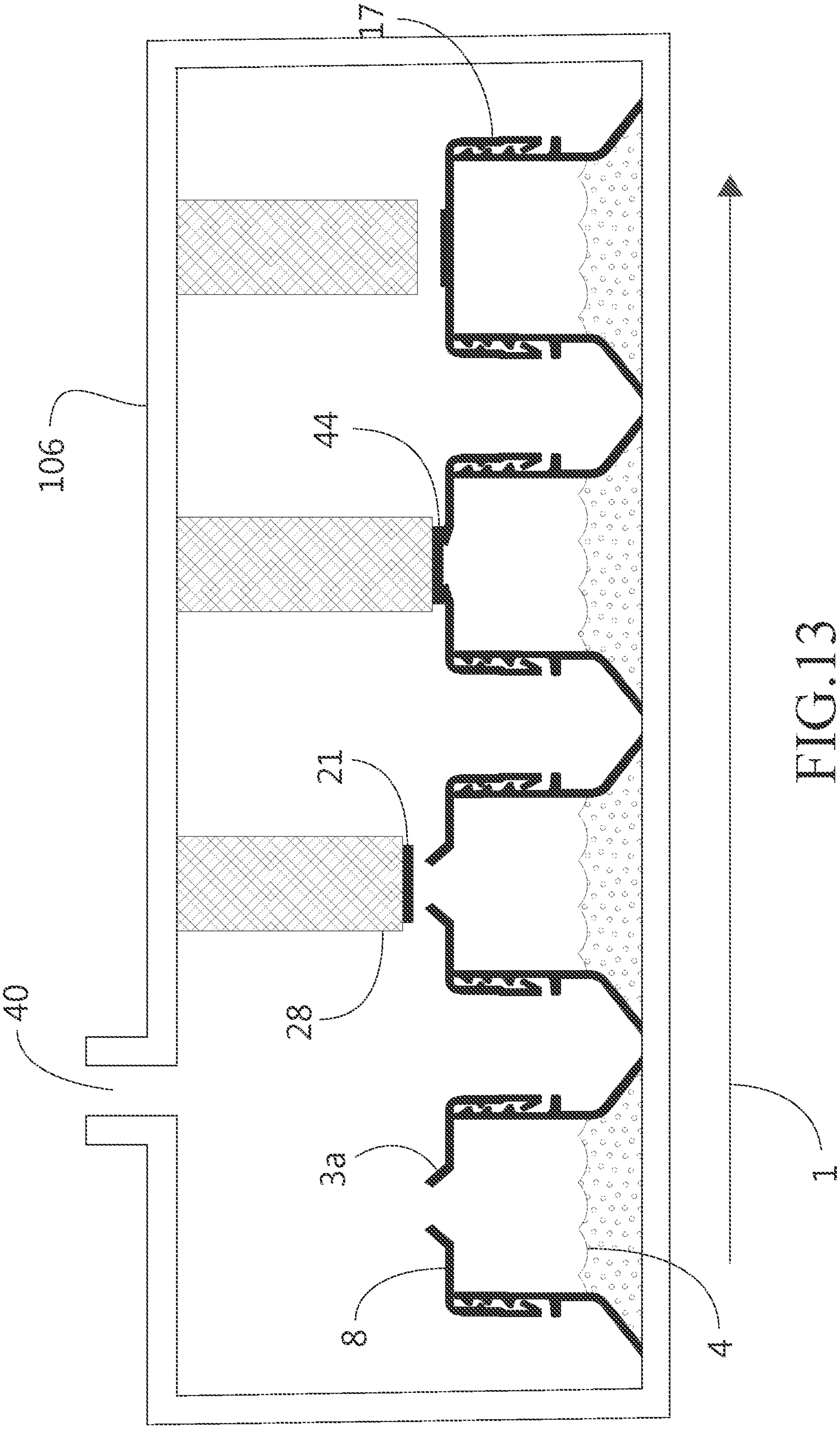

FIG. 13 shows an embodiment of the present disclosure much like FIG. 12 however in the embodiment the Seal applicator (28) does provide a separate seal. In this embodiment the seal applicator manipulates specifically designed material on the cap (3*a*) to reform and reseal the cap in conjunction with providing additional seal material (21). This additional seal material maybe a plastic which is heated and bonded to the container cap or is otherwise ultrasonically welded onto the cap (44). The additional seal material may also be a molten plastic material that is applied to the perforated hole in the container and which then sets forming an airtight seal in the container cap. The application of heat for bonding is beneficial as a sterilization method when introducing foreign parts and materials into the system.

Figure 14:
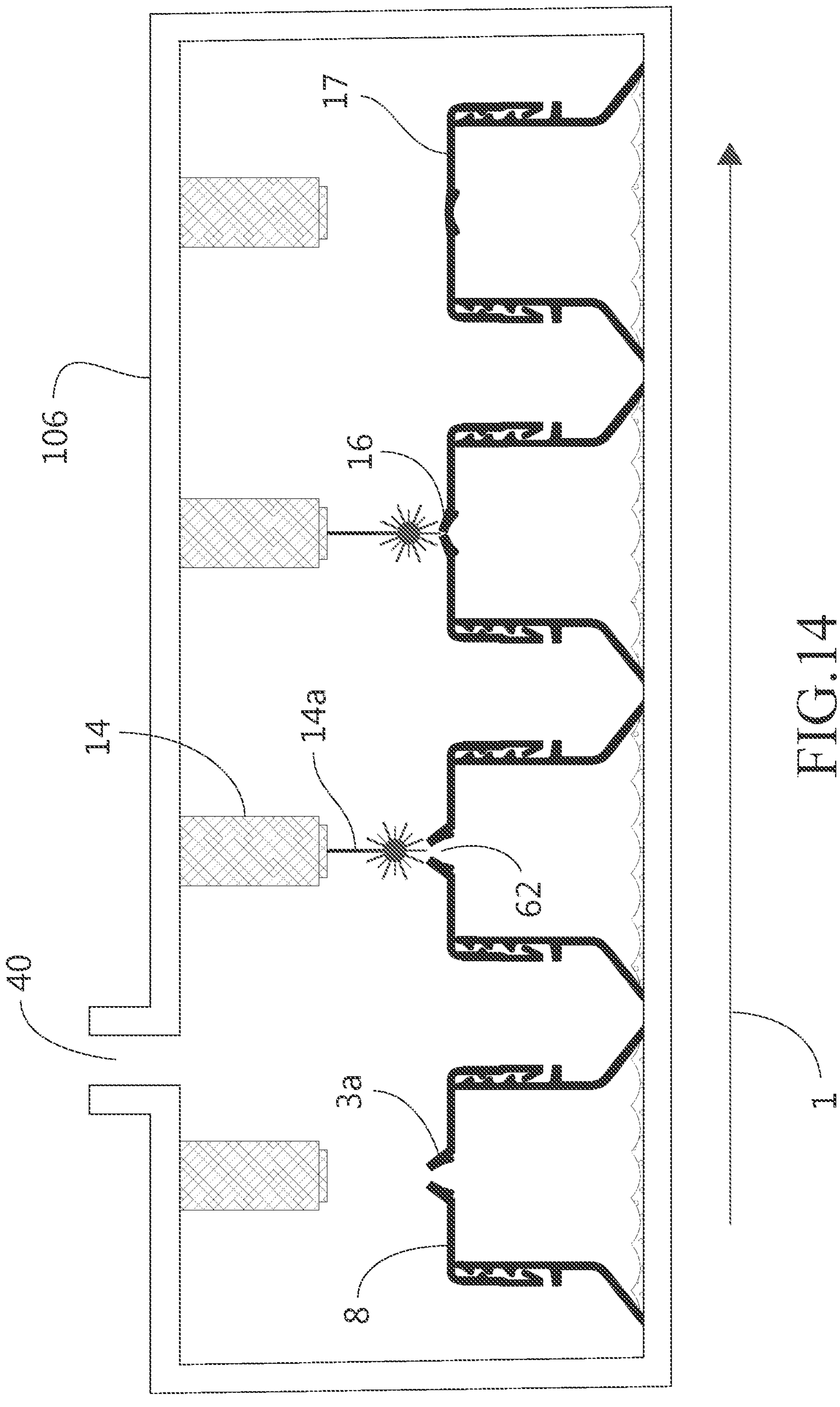

FIG. 14 shows in more detail a potential embodiment of the Sealing means or device (106) of the present disclosure. Shown is a simplified production line progressing in direction from left to right (1). A filled container has a perforated cap (8) enters the Sealing means or device. After which a Laser emitter (14) fires a Laser beam (14*a*) toward the area defining the hole (62) in the perforated cap. This quickly heats and melts the redundant material (16) surrounding the perforation site, collapsing said material into itself resealing the hole in the cap (17).

Figure 15:
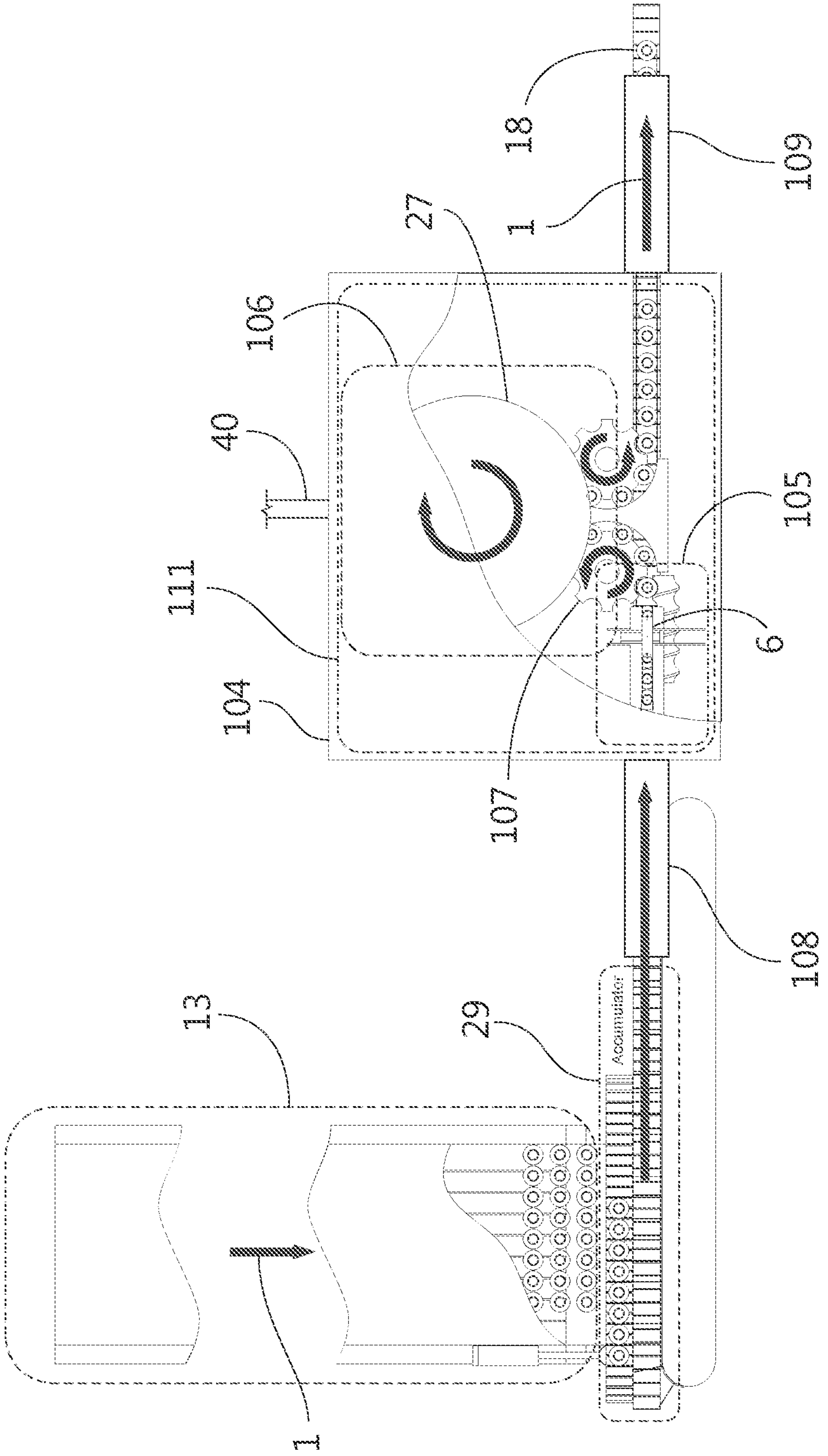
FIGS. 15-16 show exemplary portions of a production line according to some embodiments.

FIG. 15 shows another embodiment of the present disclosure in a plan view. Shown is a portion of a production line (1) beginning with a cooler (13) producing cooled, filled and capped containers (12). Depending on the container design and ensuing base stability post cooling an embodiment of the disclosure may contain an accumulation device (29) which may organize the containers from an unstable position to a stable position before passing them onto the aseptic environment (111) of the Aseptic Line Converter Chamber (104). One example of a prior art accumulation device is disclosed in EP 2851334 which is incorporated herein in its entirety. In this embodiment of the disclosure after the containers are sanitized which may begin in the cooling tunnel itself, by way of sanitizing spray for example, and could also include sanitizing in the entry tunnel (108) the containers are passed to the Perforation means or device (105) which contains a single station, linear Perforation mechanism (6). After perforating the cap or seal of the container the container is conveyed by means of rotary star-wheel conveyer (107) to the Sealing means or device (106), in which is located in a Rotary sealing system (27). The rotary sealing system is capable of sealing multiple containers simultaneously and with greater efficiency than a single station sealing mechanism. In this embodiment of the disclosure an additional fluid, for example nitrogen, may be introduced into the headspace before sealing at an increased pressure through the Secondary fluid supply line (40). This multistage barrel rotary system produces the Vacuum Modified Re-sealed container (18) which leaves the through the Exit port (109) continues for further processing.

Figure 16:
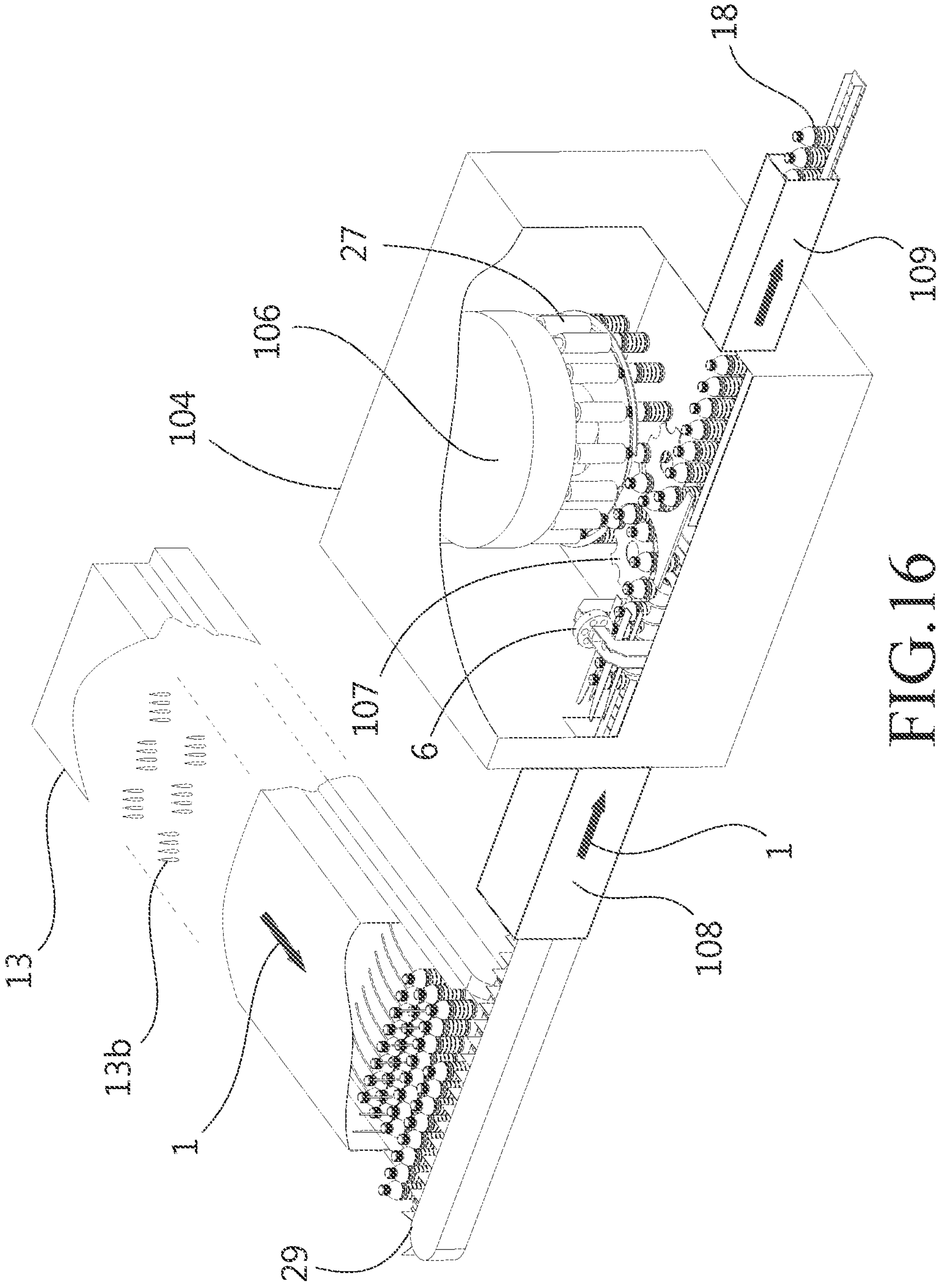

FIG. 16 shows an embodiment much like that shown in FIG. 15 of the present disclosure in an isometric view. Shown is a portion of a production line (1) beginning with a cooler (13), in this embodiment a water spray (13*b*) is used to produce cooled, filled and capped containers (12). Depending on the container design and ensuing base stability post cooling an embodiment of the disclosure may contain an accumulation device (29) which may organize the containers before passing them through the entry port (108) of the Converter Chamber (104). In this embodiment of the disclosure after the containers are sanitized they are passed to the Perforation means or device which contains a single station, linear Perforation mechanism (6). After perforating the cap or seal of the container to create a second headspace within the container, the container is conveyed by means of rotary star-wheel conveyer (107) to the Sealing means or device (106), in which is located a Rotary sealing system (27). Finally, the headspace may be modified to a third headspace pressure through the addition of further fluid such as Nitrogen to create Vacuum modified re-sealed containers (18) that leave the Aseptic Line Converter Chamber through the Exit port (109) and move on to be further processed.

Figure 17:
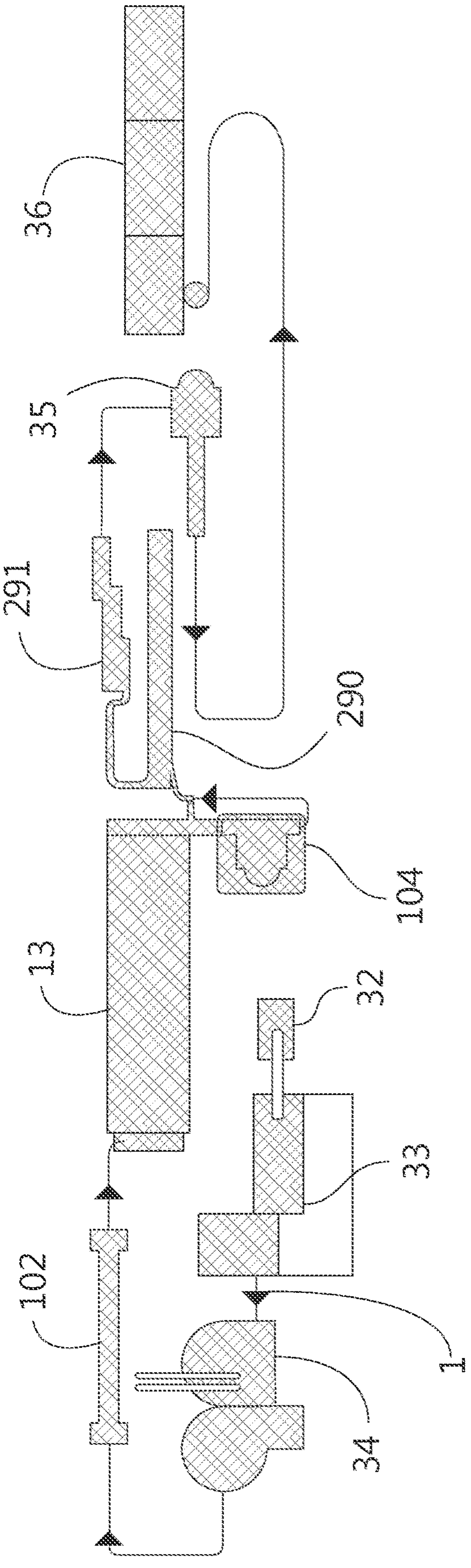
FIG. 17 shows another exemplary production line according to some embodiments.

FIG. 17 shows a simplified production line direction (1), indicating where the Aseptic Line Converter Chamber (104) could be integrated. This embodiment shows an inline blow fill operation where the line begins with Pre-form heating (32) in preparation for container blowing at station (33). The containers are then sent to the filler (34) where they are filled and capped. The containers are then conveyed to the inverter (102). Following this the containers are cooled in the cooler (13) before entering the Aseptic Line Converter Chamber (104). The container moves either to an accumulation table (290) or through the conveyor system (291) with the container having a second or third headspace pressure. Following this a labeler (35) and packer (36) complete the processing of the containers.

DRAWING DESCRIPTIONS

FIG. 1 A simplified production line direction (1). An empty container (2) is filled with a hot beverage (31) and the container is capped or sealed (11). A headspace (5) exists above the fluid level (4) of the filled liquid. Cooling fluid (13*b*) is sprayed over the outer surface or by similar cooling means producing a cooled container (12) with a vacuum (20). The Entry port (108) of the Aseptic Line Converter Chamber (104) wherein the outside surfaces of the container may be cleaned (15) by Sterilization or Pasteurization Cleaning Means (104*b*) emitted from a Sterilization Device (104*c*). When verifiably cleaned the container engages with a Perforator Means or Device (105) and the cap or seal may be perforated or otherwise opened (8). Following the step of repressuring the headspace, the container is conveyed or otherwise transported (107) to a Sealing Means or Device (106) and the container may then be resealed (17). The container is now vacuum modified (18) upon exiting through the Exit port (109) to be labeled (19).

FIG. 2 shows much the same method as disclosed in FIG. 1. A recently hot-filled and capped container (11) is inverted (102), then reinverted (102*a*). The container then enters a standard cooling device (13) where cooling fluids (13*b*) are sprayed over the outside surface of the containers from outlets (13*a*). Once cooled the containers may be conveyed or moved to enter the aseptic environment (111) of the Aseptic Converter Chamber (104). The Sanitizer device (104*c*) dispenses Sanitization Means (104*b*) over the outer surfaces of the containers. In this embodiment they reach the Perforator means or device (105) then engages with a Sealing means or device (106).

FIG. 3 shows the Aseptic Converter Chamber (104) comprising an entry port or tunnel (108) and an exit port or tunnel (109). A supply line (110) causing a slightly raised ambient pressure (112) to escape via the entry or exit ports towards the ambient pressure (113). The converter Chamber comprises a Sterilizing means or device (104*c*), in this embodiment emitting steam as a sterilizing means (104*b*). The Perforator means or device (105) will create an opening in the container. Following this the container is moved to a Sealing means or device (106).

FIG. 4 A Perforator means or device (105) is shown in a simplified production line direction (1). A filled container has a cap or seal (3) enclosing a previously pasteurized headspace (5). Included is a separate Secondary fluid supply line (40) for introduction of a different fluid mixture than found within the Converter Chamber. A Perforator mechanism (6) may pierce the cap and the fluid level within the container lowers (4*a*). In this embodiment the Perforator mechanism then retracts leaving a hole (62) in the now perforated cap (8).

FIG. 5 shows a Perforator means or device (105) of the present disclosure. An additional Primary fluid supply line (39). There is a Perforator mechanism (6) produces a lower fluid level (4*a*). A Primary fluid supply line (39) thus providing for an aseptic fluid liquid (9). The Primary aseptic fluid supply line (39) will provide the aforementioned aseptic fluid to the system and onto into container. In this embodiment the fluid level within the container lowers (4*a*) as the Perforator mechanism pierces the container cap. The Perforator mechanism then retracts leaving a hole (62) in the now perforated cap (8).

FIG. 6 shows an embodiment much like FIG. 5 however the cap or seal (3) has a raised or otherwise manipulated portion of geometry (3*a*) located where the Perforator mechanism (6) is designed to perforate the cap. The Perforator mechanism has additional outlets or openings (6*b*). A perforated cap (8). The transfer of ambient aseptic fluid (7). The Primary fluid supply line (39) which enters the Perforator means or device (105) from a previously aseptically sanitized source.

FIG. 7 shows the diameter of the mechanism (6) above the holes (6*b*) may be increase. The container headspace (5) is neutralized by the inflow of aseptic fluid present in the chamber (7). The container is then filled with a second injected aseptic fluid (9) supplied from a Primary supply line (39).

FIG. 8 shows the Perforator means or device (105). A simplified production line direction (1). A filled container has a cap or seal (3) enclosing a headspace (5) defining a first fluid level (4) enters the Perforator means or device area (105). The cap has redundant material (3*a*) designed to control the flow direction of any melted material (16). A Laser emitter (14) emits a Laser cutting beam (14*a*) which quickly perforates the cap (8). Aseptic fluid of liquid or gas (7) is introduced FIG. 9 A production line direction (1). A cap (3) has a thin segment (60) designed in its center and this area is targeted by the puncture mechanism (6) to allow aseptic gas or fluid or liquid to flow through the opening (62).

FIG. 10 A production line direction (1). A cap (3) has an upwardly protruding section (80). A cutting mechanism (81) that dislodges the protruding section (82).

FIG. 11 shows the Sealing means or device (106). A production line direction (1). The container has a perforated cap (8) and Seal applicator means (28) applies a seal (21) resealing the container (44). Then the Seal applicator then disengages from the resealed container cap (17). The Secondary fluid supply line (40) may be configured to provide an aseptic pressurizing gas.

FIG. 12 shows a production line direction (1), a perforated cap (8) with a raised portion of redundant cap material (3*a*) which the seal applicator (28) rearranges and thereby reseals (44) the container cap (17). A Secondary fluid supply line (40) that enters the Sealing means or device (106).

FIG. 13 shows a production line direction (1), a perforated cap (8) with a raised portion of redundant cap material (3*a*) which the seal applicator (28) introduces new sealing material (21) and rearranges and thereby reseals (44) the container cap (17). A Secondary fluid supply line (40) that enters the Sealing means or device (106).

FIG. 14 shows a Sealing means or device (106). A production line direction (1). A filled container has a perforated cap (8). After which a Laser emitter (14) fires a Laser beam (14*a*) toward the hole (62). This quickly melts the cap (16) resealing the hole in the cap (17).

FIG. 15 shows a production line moving direction (1) beginning with a cooler (13) producing cooled, filled and capped containers (12). An accumulation device (29) passing containers onto the aseptic environment (111) of the Aseptic Line Converter Chamber (104) through the entry tunnel (108) the containers are passed to the Perforation means or device (105) containing a Perforation mechanism (6). The container is conveyed by means of rotary star-wheel conveyer (107) to the Sealing means or device (106), in which is located in a Rotary sealing system (27). The Secondary fluid supply line (40) enters the system. Then the Vacuum Modified Re-sealed container (18) leaves from the Exit port (109).

FIG. 16 shows a production line moving direction (1) beginning with a cooler (13) with a water spray (13*b*) producing cooled, filled and capped containers (12). An accumulation device (29) passing containers onto the aseptic environment (111) of the Aseptic Line Converter Chamber (104) through the entry tunnel (108) the containers are passed to the Perforation means or device (105) containing a Perforation mechanism (6). The container is conveyed by means of rotary star-wheel conveyer (107) to the Sealing means or device (106), in which is located in a Rotary sealing system (27). Then the Vacuum Modified Re-sealed container (18) leaves from the Exit port (109).

FIG. 17 shows a production line direction (1) where the Aseptic Line Converter Chamber (104) could be integrated into the production line. A Pre-form heating system (32) leads to a container blowing at station (33). The containers are then sent to the filler and capper (34). The containers are then conveyed to the inverter (102). Following this the containers are cooled in the cooler (13) before entering the Aseptic Line Converter Chamber (104). The container moves either to an accumulation table (290) or through the conveyor system (291). Following this a labeler (35) and packer (36).

REFERENCE NUMERALS (1) Direction of the production line.
(2) Empty container.
(3) Cap or seal.
(3*a*) Raised cap portion.
(4) Fluid level.
(4*a*) Lowered Fluid level.
(5) Headspace.
(6) Perforator mechanism.
(6*b*) Perforator injector barrel openings.
(7) Ambient aseptic fluid flow direction.
(8) Perforated cap.
(9) Injected aseptic fluid flow direction.
(11) Filled and capped or sealed container.
(12) Filled, capped and cooled container.
(13) Cooling Device.
(13*a*) Cooler fluid dispenser.
(13*b*) Cooling Fluid.
(14) Laser emitter.
(14*a*) Laser beam.
(15) Cleaning step.
(16) Melted cap material.
(17) Resealed container cap.
(18) Vacuum Modified Re-sealed container.
(19) Labelled and processed container.
(20) Container vacuum distortion.
(21) Seal.
(27) Rotary sealing system.
(28) Seal applicator.
(29) Accumulation device.
(31) Beverage.
(32) Pre-form heater.
(33) Bottle blowing.
(34) Filling and Capping.
(35) Labeler.
(36) Packer.
(39) Primary fluid supply line.
(40) Secondary fluid supply line.
(44) Resealing container.
(60) Thin section of cap.
(62) Hole in cap.
(80) Upwardly protruding section of cap.
(81) Cutting mechanism.
(82) Dislodged protruding section of cap.
(102) Container inverter.
(102*a*) Container reversion.
(104) Aseptic Converter Chamber.
(104*b*) Sterilization/Sanitization means.
(104*c*) Sterilization/Sanitization device.
(105) Perforator means or device.
(106) Sealing means or device.
(107) Conveying step.
(108) Entry port.
(109) Exit port.
(110) Filtered gas Inflow.
(111) Aseptic Environment.
(112) Slight positive pressure.
(113) Slight negative pressure.
(290) Accumulation table.
(291) Conveyor system.

The invention claimed is:

1. A system for processing containers, the system comprising:
an apparatus for processing sealed plastic containers having a first headspace pressure, the apparatus comprising:
an open entry port or tunnel for continuously receiving containers;
a sanitizer configured to sanitize outside surfaces of the received containers by sterilization or pasteurization;
a perforator configured to perforate or open a cap or seal of the containers within the apparatus;
a sealer configured to seal the perforation or opening formed in the cap or seal of the containers;
an open exit port or tunnel for continuously exiting the processed containers; and
a conveyor system configured to transport or convey the containers from the open entry port or tunnel, through and within the apparatus, to the open exit port or tunnel and away from the sanitized environment of the apparatus;
wherein, the apparatus is further configured to: (i) maintain a sanitized environment of the containers within the apparatus: (ii) maintain a sanitized environment of the containers, caps or seals of the containers within the perforator; and, (iii) maintain a sanitized environment of the containers, caps or seals of the containers within the sealer; and,
a production line positioned upstream of the apparatus, the production line comprising:
a tiller for filling empty blow-moulded containers with a heated liquid to pasteurize inside surfaces of the containers; and,
a capper for sealing the filled blow moulded containers.

2. The system of claim 1, wherein the production line comprises a blow-moulding station for blow-moulding the containers.

3. The system of claim 1, wherein the production line comprises a cooler device and/or a water spray device for cooling the heated liquid.

4. The system of claim 1, wherein the production line comprises a conveyor system for transporting the containers along the production line and to the open entry port or tunnel of the apparatus.

5. The system of claim 1, comprising a further production line positioned downstream of the apparatus, the further production line comprising tithe conveyor system for transporting the containers from the exit open port or tunnel and away from the sanitized environment of the apparatus to a labeler and/or a packer.

6. The system of claim 1, wherein the apparatus is an aseptic chamber.

7. The system of claim 1, wherein the perforator comprises a mechanical perforator device and/or laser emitter.

8. The system of claim 1, wherein the perforator comprises a supply line allowing introduction of a sanitized fluid to a headspace of the container to increase the first headspace pressure to a second headspace pressure being at least 0.0003 psi above atmospheric pressure.

9. The system of claim 8, wherein the perforator, and/or the sealer is/are pressurized and sanitized within a sealed environment and the second headspace pressure is increased above 0.001 psi.

10. The system of claim 1, comprising a supply line and the sanitized environment of the apparatus is maintained by introduction of gases to the apparatus through the supply line causing a slightly raised ambient pressure to escape via the open entry port or tunnel and/or the open exit port or tunnel.

11. The system of claim 10, wherein the sanitized environment of the perforator is shared with the sanitized environment of the apparatus.

12. The system of claim 10, wherein the sanitized environment of the sealer is shared with the sanitized environment of the apparatus.

13. The system of claim 12, wherein the sanitized environment of the sealer is shared with both the sanitized environment of the apparatus and the sanitized environment of the perforator.

14. The system of claim 1, wherein the perforator and/or the sealer comprises a secondary fluid supply line and the sanitized environment of the perforator and/or of the sealer is maintained by introduction of a sanitized fluid through the secondary fluid supply line.

15. The system of claim 14, wherein the sanitized fluid includes nitrogen.

16. The system of claim 1, wherein the perforator, and/or sealer comprises a supply-line allowing introduction of an additional sanitized fluid.

17. The system of claim 16, wherein the additional sanitized fluid includes nitrogen or a sweetener or flavour ingredient.

18. The system of claim 16, wherein the sealer provides a pressure seal against a surface of the sealed container and the additional sanitized fluid pressurizes the container creating a third headspace pressure between 0.001 psi and 15 psi.

19. The system of claim 1, wherein the perforator, and/or the sealer is/are a rotary device.

20. The system of claim 1, wherein the sealer comprises a seal applicator device configured to apply a seal on the perforation or opening, the seal being formed by inserting a plug, applying heat, ultrasonic welding or applying glue.

21. The system of claim 1, wherein the sanitizer comprises a sterilization device, the sterilization device being configured to include or provide at least one of: a steam tunnel, hydrogen peroxide spray, flash heat or pasteurization, or radiation.

22. The system of claim 21, wherein the sanitizer is configured to initiate cleaning or sanitizing of the containers before the open entry port or tunnel of the apparatus.

* * * * *